(12) United States Patent
Joshi et al.

(10) Patent No.: US 12,744,031 B2
(45) Date of Patent: Sep. 22, 2026

(54) GENERATING REAL-TIME AUDIO DUBBING FOR A VIDEO USING A CONCURRENT BATCH FRAMEWORK

(71) Applicant: Microsoft Technology Licensing, LLC, Redmond, WA (US)

(72) Inventors: Vikas Joshi, Bengaluru (IN); Shubham Bansal, Hyderabad (IN); Arijit Mukherjee, Hyderabad (IN); Rupeshkumar Rasiklal Mehta, Hyderabad (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 141 days.

(21) Appl. No.: 18/917,755

(22) Filed: Oct. 16, 2024

(65) Prior Publication Data

US 2026/0065897 A1 Mar. 5, 2026

(30) Foreign Application Priority Data

Aug. 29, 2024 (IN) ............................ 202411065325

(51) Int. Cl.
*G10L 15/00* (2013.01)
*G10L 13/02* (2013.01)
*G10L 15/26* (2006.01)

(52) U.S. Cl.
CPC ............ *G10L 15/005* (2013.01); *G10L 13/02* (2013.01); *G10L 15/26* (2013.01)

(58) Field of Classification Search
CPC ....... G10L 15/005; G10L 25/57; G10L 13/02; G10L 13/047; G10L 15/04; G10L 15/16; G10L 15/26; G10L 25/30; G10L 21/10; G10L 17/22; G06F 40/40; G06F 40/58; G06V 10/82; G06N 3/045; G06N 3/0464; G06N 3/0475; G06N 3/048; G06N 3/044; G06N 3/0442; G06N 3/0455; G06N 3/091;

(Continued)

(56) References Cited

U.S. PATENT DOCUMENTS 11,132,518 B2 * 9/2021 Zhang .................. G10L 15/063
11,195,507 B2 * 12/2021 Kumar .................... G10L 15/19

(Continued)

OTHER PUBLICATIONS

Wu, Yihan, et al. "Videodubber: Machine translation with speech-aware length control for video dubbing." Proceedings of the AAAI conference on artificial intelligence. vol. 37. No. 11. 2023. (Year: 2023).*

(Continued)

*Primary Examiner* — Edgar X Guerra-Erazo
(74) *Attorney, Agent, or Firm* — Ray Quinney & Nebeker P.C.; Christopher K. Hallstrom

(57) ABSTRACT

This disclosure describes a framework for generating real-time audio translations of videos on a client device. Specifically, this disclosure describes a video dubbing system that utilizes a concurrent batch-processing architecture to provide real-time audio translations of videos on a client device. Additionally, in one or more implementations, the video dubbing system utilizes time-aware segmentation to prevent audio misalignment of the translated audio. As described below, the video dubbing system efficiently provides high-quality audio translations of videos that accurately align with the video content for the entire video, regardless of the video's length.

20 Claims, 11 Drawing Sheets

(58) Field of Classification Search
CPC ........ G06N 3/092; G06N 3/094; G06N 3/096; G06N 3/098; G06N 3/0985; G06N 3/09; G06N 3/0895; G06N 3/088; G06N 20/10; G06N 20/20
See application file for complete search history.

(56) References Cited

U.S. PATENT DOCUMENTS

| | | | | |
|---|---|---|---|---|
| 12,051,422 | B2 | 7/2024 | Yoshioka | |
| 2015/0347399 | A1* | 12/2015 | Aue | H04M 3/42 704/2 |
| 2019/0354592 | A1 | 11/2019 | Musham | |
| 2020/0372114 | A1 | 11/2020 | Auvenshine | |
| 2021/0027761 | A1* | 1/2021 | Witherspoon | G06F 40/58 |
| 2022/0199086 | A1* | 6/2022 | Liu | G06F 40/279 |
| 2024/0029709 | A1 | 1/2024 | Cai | |
| 2024/0194183 | A1 | 6/2024 | Gupta | |
| 2024/0265211 | A1 | 8/2024 | Mihai | |
| 2024/0265215 | A1 | 8/2024 | Padfield | |

OTHER PUBLICATIONS

Rao, Zhiqiang, et al. "Length-aware NMT and adaptive duration for automatic dubbing." Proceedings of the 20th International Conference on Spoken Language Translation (IWSLT 2023). 2023. (Year: 2023).*

Federico, et al., "From Speech-to-Speech Translation to Automatic Dubbing", In Repository of arXiv:2001.06785v3, Feb. 2, 2020, 05 Pages.

Ignat, et al., "Learning Human Action Representations from Temporal Context in Lifestyle Vlogs", Proceedings of TextGraphs—17: Graph-based Methods for Natural Language Processing, Aug. 15, 2024, 18 Pages.

Lee, et al., "Direct speech-to-speech translation with discrete units", In Repository of arXiv:2107.05604v2, Mar. 21, 2022, 13 Pages.

Urban, et al., "How to recognize and translate speech", Microsoft Azure, Retrieved from Internet URL:—https://learn.microsoft.com/en-us/azure/ai-services/speech-service/how-to-translate-speechtabs=terminal&pivots=programming-language-csharp, Aug. 28, 2024.

International Search Report and Written Opinion received for PCT Application No. PCT/US2025/030493, Aug. 22, 2025, 17 pages.

* cited by examiner

GENERATING REAL-TIME AUDIO DUBBING FOR A VIDEO USING A CONCURRENT BATCH FRAMEWORK

CROSS-REFERENCE TO RELATED APPLICATIONS

This application claims benefit and priority to Indian Provisional Application No. 202411065325, filed on Aug. 29, 2024, the entirety of which is incorporated herein by reference.

BACKGROUND

As videos are shared with a global audience, it is important to consider the language barriers that exist. Many individuals who speak different languages may want to watch these videos, but they need translations to understand the narrative or other audio content. Unfortunately, not all videos have audio tracks available in different languages. Some video playback systems attempt to provide automatic translations for videos, but these systems face several challenges, especially when it comes to on-the-fly audio translations.

BRIEF DESCRIPTION OF THE DRAWINGS

The following detailed description provides specific and detailed implementations accompanied by drawings. Additionally, each of the figures listed below includes illustrated examples corresponding to one or more implementations discussed in this disclosure.

DETAILED DESCRIPTION

Figure 1:
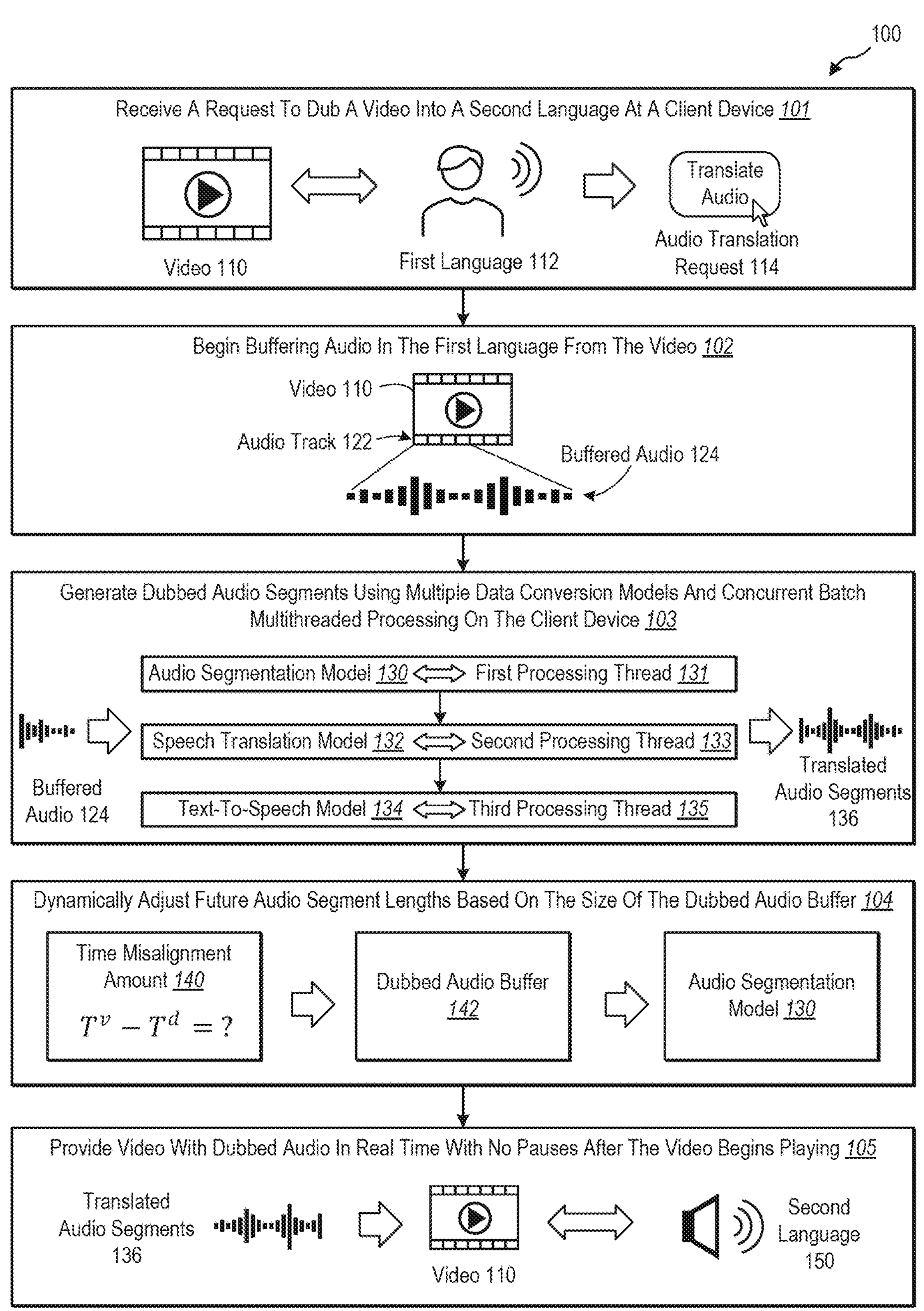
FIG. 1 illustrates an overview of the video dubbing system that generates and provides translated audio in real time for a video using concurrent processing on a client device.

This disclosure describes a framework for generating real-time audio translations (e.g., dubbing) of videos on a client device. Specifically, this disclosure describes a video dubbing system that utilizes a concurrent batch-processing architecture to provide real-time audio translations of videos on a client device. Additionally, in one or more implementations, the video dubbing system utilizes time-aware segmentation to prevent audio misalignment of the translated audio, and in some cases, text (e.g., closed captioning). As described below, the video dubbing system efficiently provides high-quality audio translations of videos that accurately align with the video content for the entire video, regardless of the video's length.

Implementations of the present disclosure provide benefits and solve problems in the art with systems, computer-readable media, and computer-implemented methods by using a video dubbing system to provide real-time video dubbing on a client device with audio in a language different from the original audio included in the video. As described below, the video dubbing system utilizes a multithreading processing framework that allows a client device to provide audio translations for an entire video regardless of length. Additionally, the video dubbing system utilizes time-aware segmentation to prevent audio misalignment, ensuring that the translated audio accurately synchronizes with the video content.

To elaborate on how the video dubbing system generates real-time audio translations in one or more videos, in various implementations, the video dubbing system segments audio from a video into first and second audio segments using an audio segmentation model on a first processing thread of a client device. Additionally, the video dubbing system generates a first translated text string in a second language from the first audio segment using a speech translation model on a second processing thread of the client device before generating a first translated audio segment in the second language from the first translated text string using a text-to-speech model corresponding to the second language on a third processing thread of the client device. Concurrent with generating the first translated audio segment on the third processing thread, the video dubbing system can generate a second translated text string in the second language from the second audio segment using the speech translation model on the second processing thread of the client device. Furthermore, the video dubbing system generates a second translated audio segment in the second language from the second translated text string using the text-to-speech model on the third processing thread of the client device. After generating one or more translated audio segments, the video dubbing system provides the first translated audio segment with the video.

As mentioned, current video playback systems face several technical challenges. For example, many current systems face challenges due to the need for contextual understanding and translation processing delays. Offline video dubbing approaches, which rely on the full audio track, are often impractical as websites may not provide the full audio or require users to wait for several minutes. Additionally, many current systems do not address timing discrepancies, resulting in potential misalignment between video playback and translated audio. These are just a few examples of the issues that exist with current video translation services.

As another example, many current systems that provide real-time dubbing face challenges due to the need for contextual understanding and delays caused by translation processing. These systems suffer from implementation constraints of client devices, which cause lagging and/or audio misalignment during video playback. For instance, the multiple steps involved in converting and generating translated audio result in unwanted pauses, lagging, and/or audio misalignment during video playback. Many current systems do not efficiently use resources, leading to longer wait times and potential delays in the dubbing process.

In some instances, current video playback systems use an offline dubbing approach. However, these approaches are largely impractical as they rely on the full audio track; but websites often do not provide full audio tracks. As a result, these current systems take a significant amount of time to obtain audio, causing users to wait for several minutes for a short video. The problem compounds with larger videos.

Furthermore, many current video playback systems do not account for timing discrepancies. This leads to potential misalignment between the video playback and the translated audio. Consequently, the video becomes confusing as the translated words do not correspond with the video content being shown.

In contrast, as described in this disclosure, the video dubbing system delivers several significant technical benefits in terms of improved efficiency, accuracy, and flexibility compared to current video playback systems. Furthermore, the video dubbing system provides several practical applications that address problems related to improving the playback of a video with real-time translated audio by utilizing concurrent block processing on a client device.

To illustrate, the video dubbing system provides concurrent or parallel multithreading to generate audio translations in real time on a client device for a video. By separating audio into segments run in batches, the video dubbing system enables segmentation, speech translation, and text-to-speech processes to be run concurrently on different threads of a client device. This concurrent processing efficiently allows for continuous audio translation of an entire video without pauses (once translation playback begins after a short buffer period), regardless of the video's length. Moreover, because of the efficiency gains, the video dubbing system provides flexibility by using concurrent processing because it allows for an entire video to be translated in real time using the limited resources of a client device.

Additionally, in some instances, the video dubbing system provides improved accuracy using time-aware segmentation to prevent audio misalignment of the translated audio. In various implementations, the video dubbing system determines the amount of available translated audio buffer. Based on this amount, the video dubbing system dynamically adjusts the length of segments, which changes the processing amounts on the different threads to ensure that no unwanted audio gaps occur as well as ensuring that time misalignment does not occur. Indeed, time-aware segmentation enables the video dubbing system to determine when to efficiently process longer audio segments or when shorter segments are needed to ensure no unwanted pauses in video playback with translated audio.

As a note, while this disclosure focuses on providing real-time audio translation (e.g., dubbing) for a video while minimizing time misalignment, the same or similar principles can be applied to translated text. In various implementations, the video dubbing system provides the translated text it creates as part of the audio translation process with the video at the correct, corresponding time (e.g., without time misalignment). In some instances, the video dubbing system provides translated text (e.g., subtitles or closed captioning) without providing the audio translation.

As illustrated in the foregoing discussion, this disclosure utilizes a variety of terms to describe the features and advantages of one or more implementations described. As an example, the term "video" refers to digital content that includes one or more images in a sequence coupled with audio in a first language. Often, a video includes a sequence of images accompanied by music or audio that includes words spoken or sung in at least a first language. In various implementations, a video includes an image track and an audio track. The audio track may include one or more audio buffered segments or portions.

As an example, the term "dubbing" refers to applying some or all of an audio translation track to images of a video. In various implementations, dubbing includes layering or mixing a second audio translation track over a first audio track in a different language. In some instances, dubbing includes adding new dialogue (e.g., translated audio) to the audio track of a video that has already been filmed.

As another example, the term "processing thread" refers to a sequence of programmed instructions that a processing unit can execute independently. Threads enable the execution of tasks within an application or program using either a central processing unit (CPU) or a graphical processing unit (GPU). In multithreaded processing, multiple threads run concurrently, allowing for parallel execution of tasks, thereby enhancing efficiency and performance by utilizing multiple cores of the processor simultaneously. In this document, the described client devices support both actual and virtual multithreaded processing.

As an example, the term "machine-learning model" refers to a computer model or computer representation that can be trained (e.g., optimized) based on inputs to approximate unknown functions. For instance, a machine-learning model can include (but is not limited to) an autoencoder model, a distortion classification model, a neural network (e.g., a convolutional neural network or deep learning model), a decision tree (e.g., a gradient-boosted decision tree), a linear regression model, a logistic regression model, or a combination of these models.

As another example, the term "neural network" refers to a machine learning model comprising interconnected artificial neurons that communicate and learn to approximate complex functions, generating outputs based on multiple inputs provided to the model. For instance, a neural network includes an algorithm (or set of algorithms) that employs deep learning techniques and utilizes training data to adjust the parameters of the network and model high-level abstractions in data. Various types of neural networks exist, such as convolutional neural networks (CNNs), residual learning neural networks, recurrent neural networks (RNNs), generative neural networks, generative adversarial neural networks (GANs), and single-shot detection (SSD) networks.

Implementation examples and details of the video dubbing system are discussed in connection with the accompanying figures, which are described next. For example, FIG. 1 illustrates an overview of the video dubbing system that generates and provides translated audio in real time for a video using concurrent processing on a client device according to some implementations. In particular, FIG. 1 includes a series of acts 100 for providing video with dubbed translated audio in real time, performed by the video dubbing system.

As shown, the series of acts 100 includes act 101 of receiving a request to dub a video into a second language on a client device. For instance, an application on the client device, such as a media player or a web browser, plays a video 110 to a user in response to detecting a selection to play the video. In some instances, the application on conventional systems detects an audio translation request 114 to play audio for the video in a language different from the language included in the video. For example, the video is in Spanish (e.g., a first language 112) and the client device detects a selection to play the video in French (e.g., a second language).

Act 102 includes beginning buffering audio in the first language from the video. In various implementations, the video dubbing system identifies the audio track 122 (e.g., audio) of the video 110 and begins buffering the audio track into buffered audio 124 in the original or first language. For example, the video dubbing system buffers the audio track 122 as is it received from a video content provider of the video. Additional details about generating an audio buffer are provided below in connection with FIGS. 3A-3D.

Act 103 includes generating dubbed audio segments using multiple data conversion models and concurrent batch multithreaded processing on the client device. For instance, the video dubbing system processes the buffered audio 124 using an audio segmentation model 130 on a first processing thread 131 of the client device to generate audio segments. Additional details about generating audio segments are provided in connection with FIGS. 3A-3D and FIG. 4 below.

In act 103, once an audio segment is created, the video dubbing system can utilize a speech translation model 132 on a second processing thread 133 to generate translated text strings. For example, the speech translation model 132 converts audio in the first language 112 into translated text in a second language. Additionally, the video dubbing system can operate the speech translation model 132 on the second processing thread 133 while the audio segmentation model 130 is processing a subsequent buffered audio segment on the first processing thread 131. Additional details about generating translated text strings are provided in connection with FIGS. 3A-3B and FIG. 5 below.

Additionally, in act 103, once a translated text string is created, the video dubbing system can utilize a text-to-speech model 134 on a third processing thread 135 to generate a translated audio segment. For example, the text-to-speech model 134 converts translated text strings into translated audio segments 136 on the third processing thread 135 concurrently with the video dubbing system processing other audio segments on the other processing threads of the client device. Additional details about generating translated audio segments are provided in connection with FIG. 3B, FIG. 5, and FIG. 6 below.

Act 104 includes dynamically adjusting future audio segment lengths based on the size of the dubbed audio buffer. For example, as the video dubbing system generates translated audio segments 136 from the buffered audio 124, the buffered audio 124 waits in a dubbed audio buffer 142 until their corresponding time arrives in the video playback. Furthermore, the dubbed audio buffer 142 increases and decreases in length to accommodate different processing times of the original audio into translated audio versus real-time playback of the video with dubbed audio.

Accordingly, to ensure continuous playback of the video with the dubbed audio, the video dubbing system utilizes time-aware segmentation to adjust the size of upcoming segments to ensure that a minimum amount of translated audio is included in the dubbed audio buffer 142. In various implementations, the video dubbing system determines a time misalignment amount 140, which roughly compares the current video playback position to translated audio queued in the dubbed audio buffer 142. Depending on the time misalignment amount 140, the video dubbing system directs the audio segmentation model 130 to increase or decrease the amount of a future audio segment to be translated. Additional details about time-aware segmentation are provided in connection with FIGS. 3C-3D, and FIG. 7 below.

Act 105 includes providing video with dubbed audio in real time with no pauses after the video begins playing. For instance, once the video dubbing system generates the translated audio segments 136 and stores them in the dubbed audio buffer 142, the translated audio segments 136 may be provided to the application playing the video with timestamps corresponding to the original audio. In response, the application plays the video with the audio in the second language 150 dubbed over or in place of the original audio. By doing so, the video dubbing system efficiently provides real-time audio translations that accurately align with the content of a video and that are processed locally on a client device.

Figure 2:
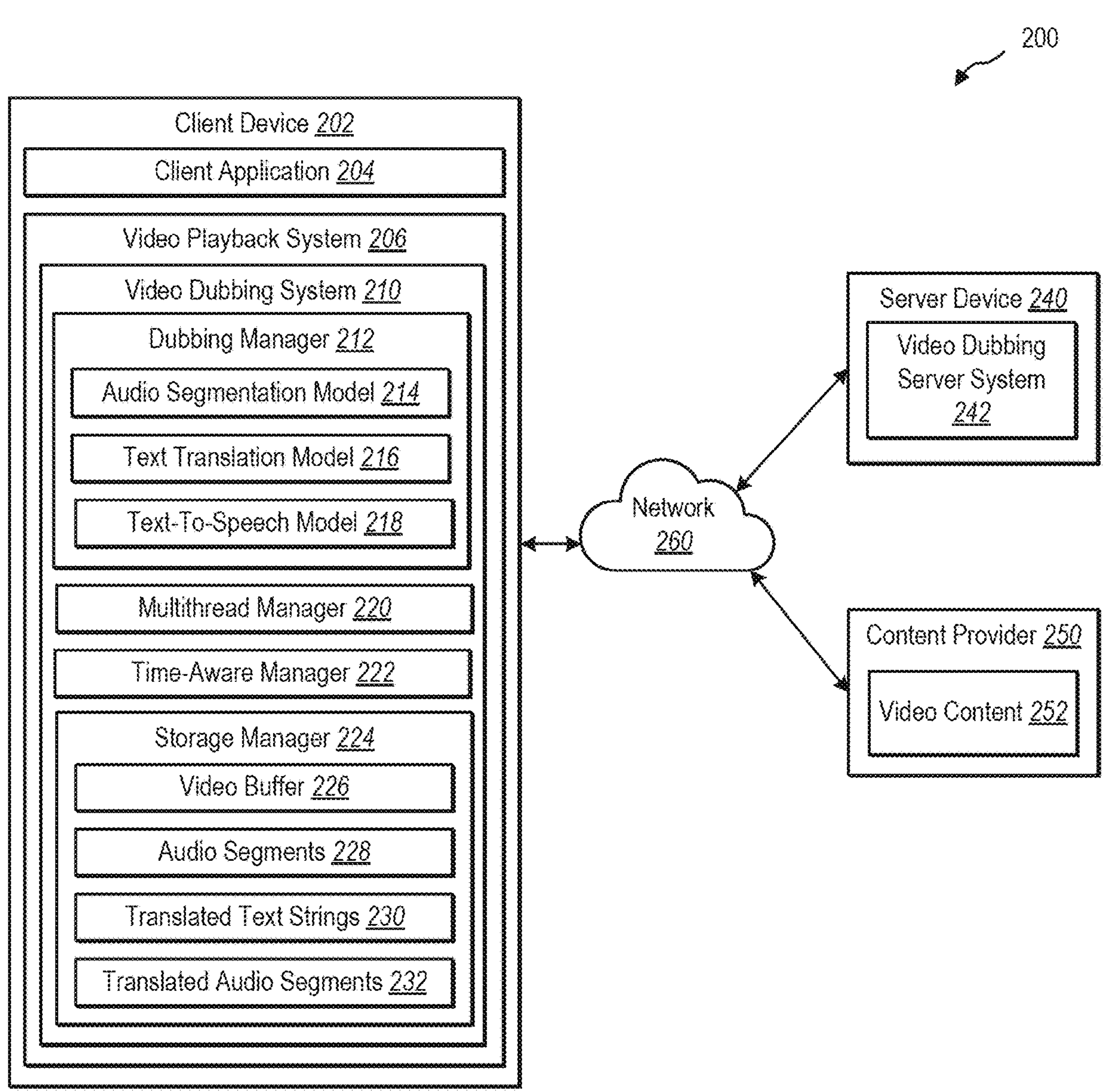
FIG. 2 illustrates a computing environment where the video dubbing system is implemented.

With a general overview in place, additional details are provided regarding the components, features, and elements of the video dubbing system. To illustrate, FIG. 2 shows an example computing environment where the video dubbing system is implemented according to some implementations. In particular, FIG. 2 illustrates an example of a computing environment 200 with various computing devices including a client device 202 with a video dubbing system 210, a server device 240 with a video dubbing server system 242, and a content provider 250 with video content. The computing devices in the computing environment 200 are connected via a network 260.

While FIG. 2 shows example arrangements and configurations of the video dubbing system 210 within the computing environment 200, other arrangements and configurations are possible. Additionally, further details regarding computing devices are provided below in connection with FIG. 10, which also includes additional details regarding networks, such as the network 260 shown.

As shown, the computing environment 200 includes a client device 202. As described further below, the client device 202 may correspond to a personal computer (PC) or another personal device, including portable devices, that include multithreaded processing capabilities. In various implementations, the client device 202 is associated with a user, such as a user who watches videos. In some implementations, the user requests that a video be played with audio with a dubbed audio track in another language. For example, the user requests to play a video in another language not included in the video.

The client device 202 includes a client application. In some implementations, the client application 204 represents a software application located on the client device 202, such as a web browser, a media player, or a content consumption application. In various implementations, the client application 204 obtains and provides (e.g., plays) videos to a user.

The client device 202 also includes the video dubbing system 206. In various implementations, the video dubbing system 206 is implemented within the client application 204. For example, the video dubbing system 206 is a feature, plugin, or extension of the client application 204.

As shown, the video dubbing system 206 implements the video dubbing system 210. In some implementations, the video dubbing system 210 is located apart from the video dubbing system 206. In some implementations, the client application 204 communicates with the video dubbing system 206 and/or the video dubbing system 210 to request and receive real-time audio dubbing of videos played by the client application 204.

In various implementations, including the illustrated implementation, the video dubbing system 210 includes various components and elements implemented in hardware and/or software. For example, the video dubbing system 210 includes a dubbing manager 212, a multithread manager 220, a time-aware manager 222, and a storage manager 224. As shown, the dubbing manager 212 includes an audio segmentation model 214, a speech translation model 216, and a text-to-speech model 218. The storage manager 224 includes a video buffer 226, audio segments 228, translated text strings 230, and translated audio segments 232, among other data used by the video dubbing system 210.

To elaborate, in various implementations, the dubbing manager 212 manages the generation of translated audio segments 232 for a video. In various implementations, the dubbing manager 212 manages the various data conversion models to process and convert the original audio into translated audio for dubbing. For example, the dubbing manager 212 utilizes the audio segmentation model 214 to generate audio segments 228 from audio stored in the video buffer 226. The dubbing manager 212 then utilizes the speech translation model 216 to generate translated text strings 230 from the audio segments 228. The dubbing manager 212 then utilizes the text-to-speech model 218 to generate the translated audio segments 232 from the translated text strings 230.

As mentioned above, the video dubbing system 210 includes the multithread manager 220, which facilitates running concurrent processing threads corresponding to the various data conversion models. Additionally, the video dubbing system 210 includes the time-aware manager 222, which determines when the audio segmentation model 214 should adjust segment sizes to ensure continuous, uninterrupted playback of a video with dubbed audio.

As shown, the computing environment 200 includes the server device 240 having the video dubbing server system 242. In various implementations, some or all of the video dubbing system 210 is located on the server device 240 (e.g., the video dubbing server system 242). If partially located on the server device 240, the video dubbing server system 242 works with the video dubbing system 210 on the client device 202 to provide real-time audio dubbing of videos. For example, the video dubbing server system 242 uses multi-threaded processing to generate and provide the translated audio segments 232 to the client device 202 for video playback with dubbed audio.

Additionally, the computing environment 200 includes the content provider 250. As shown, the content provider 250 includes video content 252, such as video provided to the client device 202 for user video. In various implementations, the content provider 250 represents multiple content providers that provide and distribute video to client devices. While the client device 202 receives video content 252 from remote sources, such as the content provider 250, in some instances, the client device 202 translates a locally stored video.

Turning to the next figures, FIGS. 3A-3D illustrate overview diagrams of generating translated audio for a video in real time using multiple audio and text processing models according to some implementations. In particular, FIGS. 3A-3D show a progression over time of generating translated audio segments using concurrent processing.

As shown, FIGS. 3A-3D each include a client device 300 with the video dubbing system 210. The video dubbing system 210 includes audio rendering 306, the audio segmentation model 214, the speech translation model 216, and the text-to-speech model 218. The client device 300 also includes a browser 302 (e.g., a client application) that plays a video 304. For example, the video 304 is provided as a stream from a content provider.

As shown, the video dubbing system 210 communicates with the browser 302. In some implementations, the video dubbing system 210 is implemented by the browser 302. For example, the video dubbing system 210 is a feature or plugin of the browser 302.

Figure 3A:
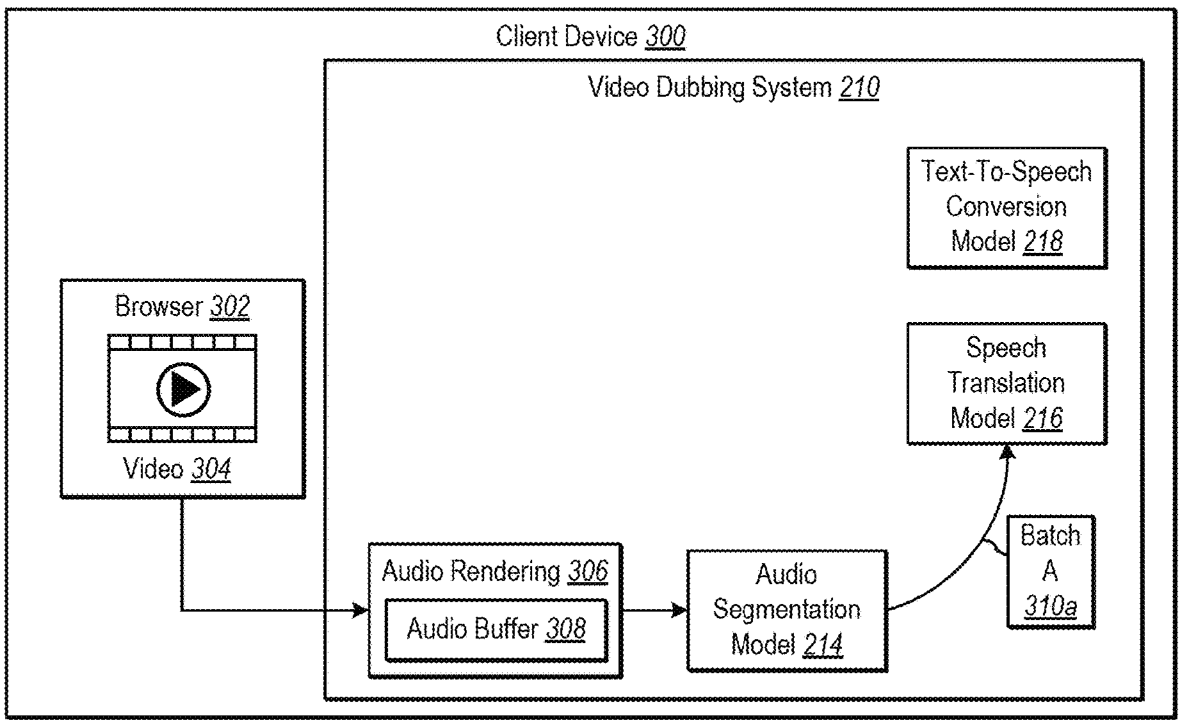
FIGS. 3A-3D illustrate overview diagrams of generating translated audio for a video in real time using multiple audio and text processing models.

FIG. 3A represents a first time instance and begins with the client device 300 receiving a selection to play the video 304. Additionally, the client device 300 receives or detects a request to play the audio of the video 304 in a different language. Because the video does not include an audio track of the requested language, the video dubbing system generates and provides the requested language in real time.

To elaborate, in response to the request to provide dubbed audio in another language, the video dubbing system 210 performs audio rendering to capture the audio from the video in an audio buffer 308. The audio buffer 308 can represent a moving or sliding window of audio received from a content provider for the video 304. In some implementations, audio rendering was performed by the browser 302. Additional details about obtaining audio in an audio buffer are provided below in connection with FIG. 4.

Based on the audio in the audio buffer 308, the video dubbing system 210 uses the audio segmentation model 214 to generate audio segments. Audio segments may range from 5-20 seconds. Each audio segment may form the beginning of a batch (e.g., a set of jobs that convert the audio segment into a translated audio segment). To illustrate, the audio segmentation model 214 generates Batch A **310*a*, which includes a first audio segment. In various implementations, the video dubbing system 210 runs the audio segmentation model 214 on a first processing thread of the client device 300. Additional details about generating audio segments from audio in the audio buffer are provided below in connection with FIG. 4**.

Figure 3B:
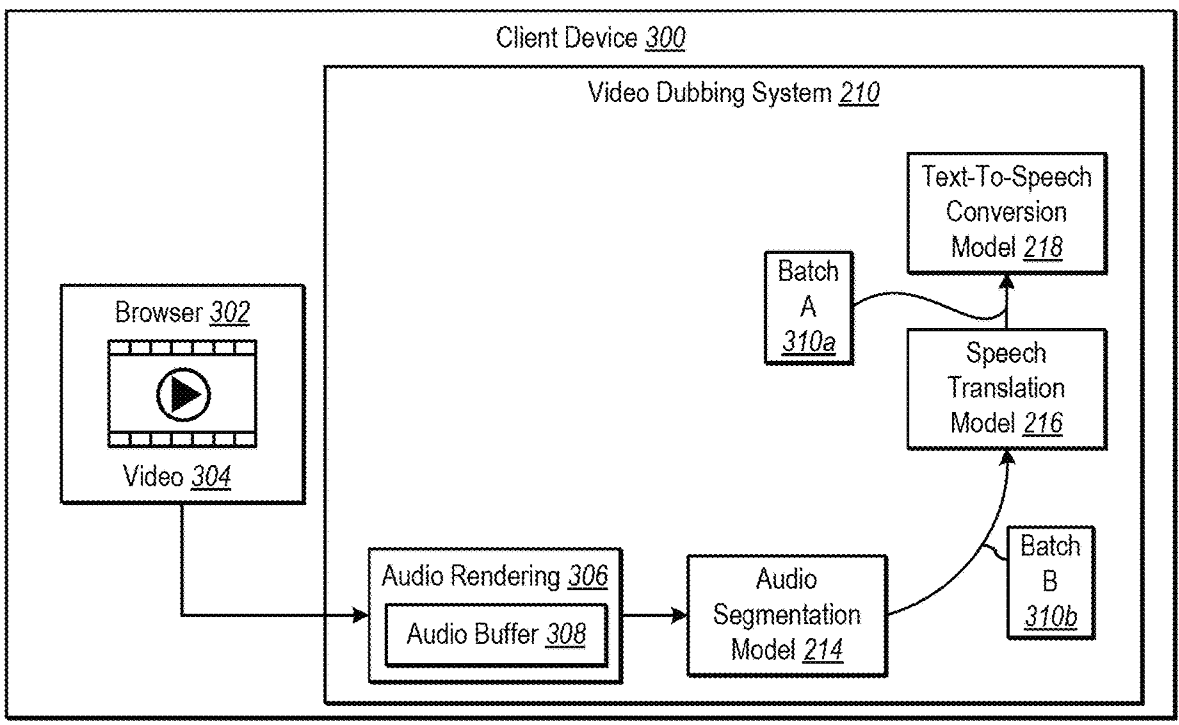

FIG. 3B represents a second time instance and includes the video dubbing system 210 processing the first audio segment with the speech translation model 216 to generate a first translated text string. Accordingly, Batch A **310*a* in FIG. 3B includes the first translated text string. As mentioned above, the video dubbing system 210 may process the speech translation model 216 on a second processing thread of the client device 300. Additional details about generating translated text strings are provided below in connection with FIG. 5**.

FIG. 3A also shows the video dubbing system 210 concurrently generating a second batch (Batch B **310*b*) that includes a second audio segment. For example, while the video dubbing system 210 uses the speech translation model 216 to generate the first translated text string on the second processing thread, the video dubbing system 210 uses the audio segmentation model 214 to concurrently generate the second audio segment from the audio buffer 308** on the first processing thread.

Figure 3C:
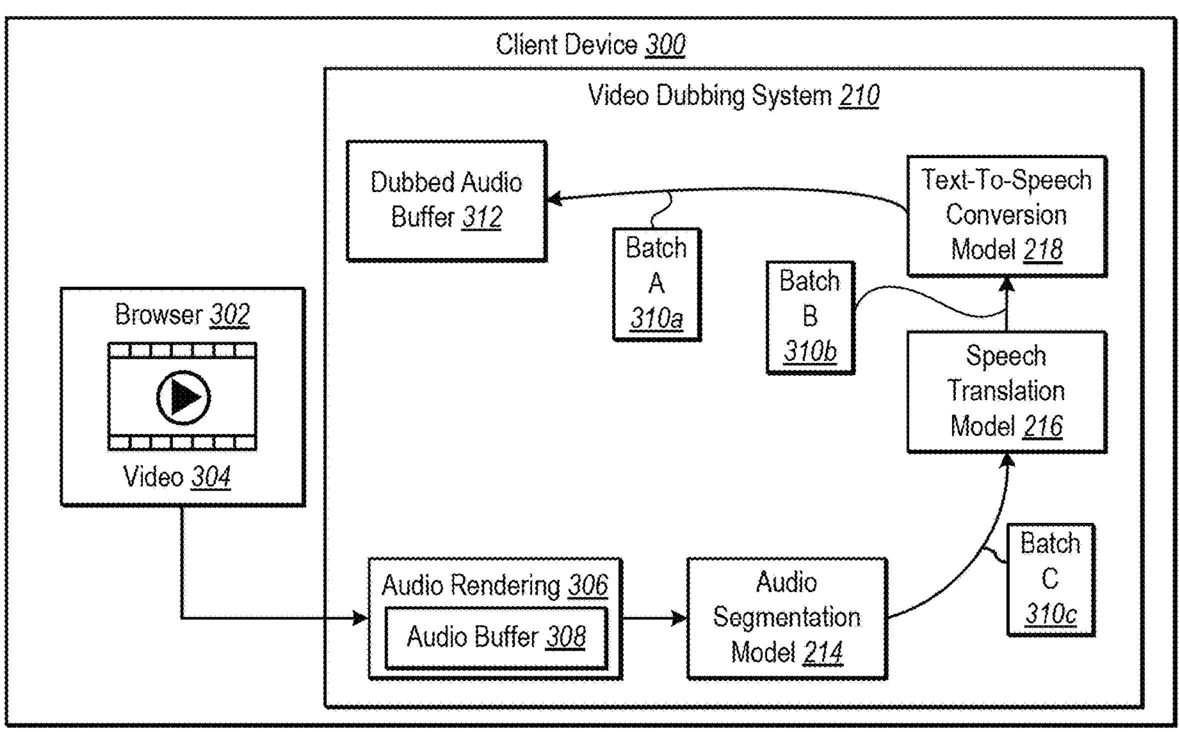

FIG. 3C represents a third time instance and includes the video dubbing system 210 processing the first translated text string with the text-to-speech model 218 to generate a first translated audio segment. Accordingly, Batch A **310*a* in FIG. 3C includes the first translated audio segment. The video dubbing system 210 may process the text-to-speech model 218 on a third processing thread of the client device 300. Additional details about generating translated audio segments are provided below in connection with FIG. 5**.

Concurrent with generating the first translated audio segment for Batch A **310*a* on the third processing thread, the video dubbing system 210 may generate a second translated text string for Batch B 310*b* on the second processing thread and a third audio segment for Batch C 310*c* on the first processing thread. Indeed, as further described below, the video dubbing system 210** provides a multithread framework for processing different subsequent batches of the audio from the video concurrently or in parallel.

FIG. 3C also includes a dubbed audio buffer 312 in the video dubbing system 210. For example, as the video dubbing system 210 processes batches through the various data conversion models, the video dubbing system 210 stores the translated audio segments in the dubbed audio buffer 312. Translated audio from the dubbed audio buffer 312 is provided to the browser 302 to play in the video 304 as a dubbed audio track in the requested language, as shown in FIG. 3D.

Figure 3D:
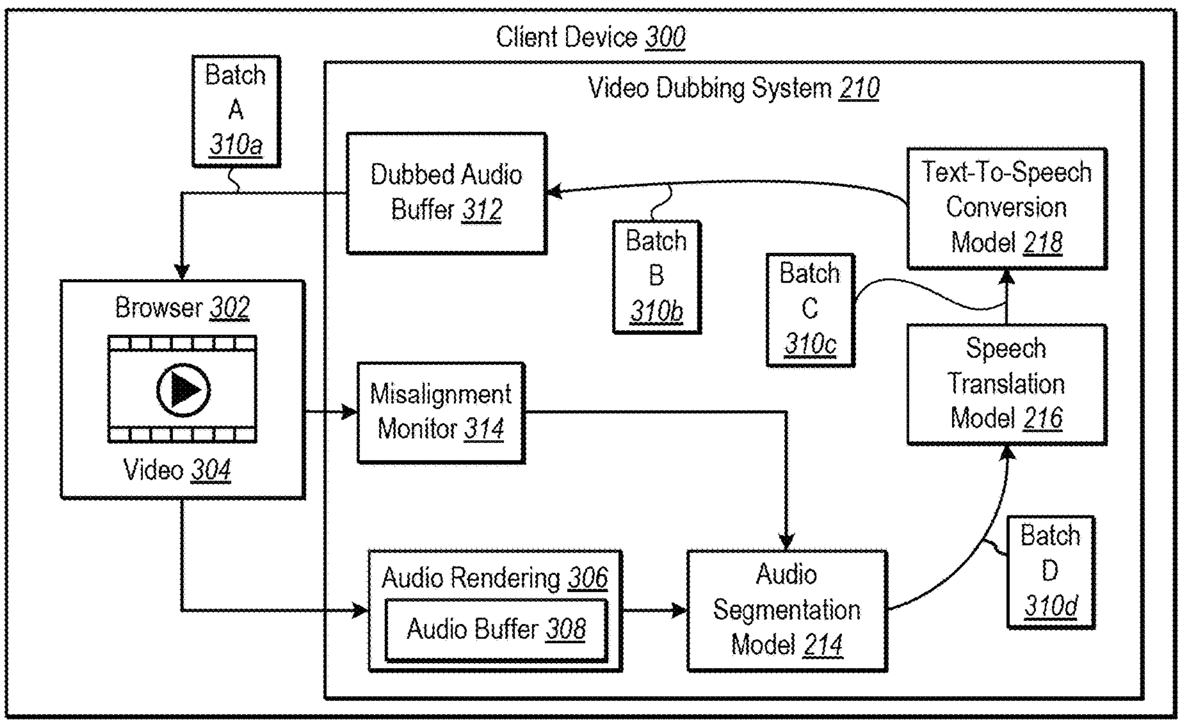

FIG. 3D represents a fourth time instance and includes the video dubbing system 210 providing Batch A 310*a* with the first translated audio segment to the browser 302 for video playback, as mentioned. In addition, FIG. 3D includes the concurrent processing of subsequent batches of audio. For example, the video dubbing system 210 generates a second translated audio segment for Batch B 310*b* on the third processing segment, a third translated text string for Batch C 310*c* on the second processing thread, and a fourth audio segment for Batch D 310*d* on the first processing thread.

FIG. 3D also includes a misalignment monitor 314, which performs time-aware segmentation. In various implementations, the video dubbing system 210 utilizes the misalignment monitor 314 to determine whether to adjust the length or size of audio segments based on the amount of translated audio included in the dubbed audio buffer 312.

As further described below, the misalignment monitor 314 may compare the current video playback position to the position of translated audio in the dubbed audio buffer 312 to determine whether to adjust the length of an upcoming audio segment. For example, the misalignment monitor 314 compares the timestamp at the end of Batch B 310*b* with the current video position to determine whether to modify the audio segment length of the fourth audio segment in Batch D 310*d*. Additional details about time-aware segmentation are provided in connection with FIG. 7 below.

The process in FIG. 3A-3D may continue until the video 304 is finished. Furthermore, because of the multithreaded processing and the time-aware segmentation, the video dubbing system 210 plays the video with translated audio in real time regardless of video length with no unwanted pauses or buffering breaks.

Figure 4:
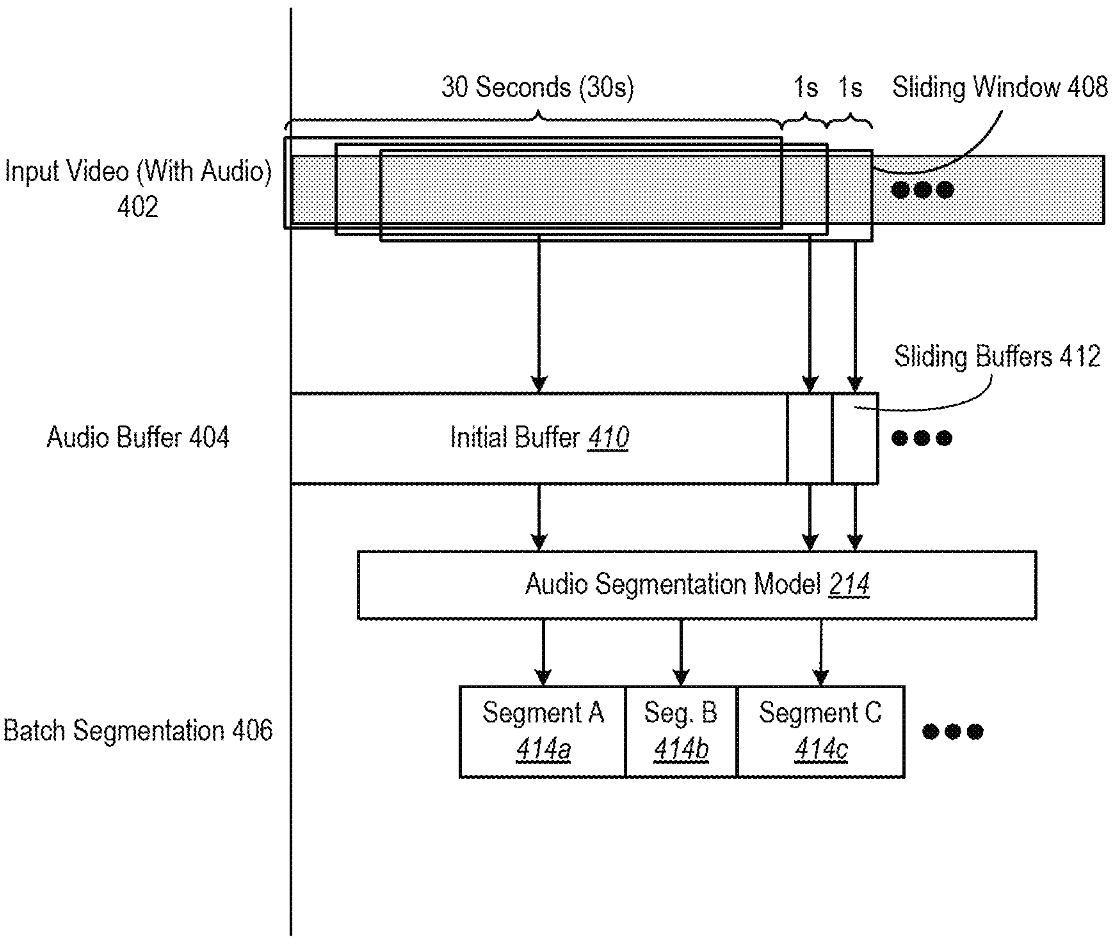
FIG. 4 illustrates a diagram of segmenting the audio in a first language from a video into segments.

As mentioned above, FIG. 4 provides additional details about generating audio segments. In particular, FIG. 4 illustrates a diagram of segmenting the audio in a first language from a video into segments according to some implementations. FIG. 4 includes different components and operations (shown in rows) associated with the video dubbing system 210 performing audio segmentation 400. Additionally, the audio segmentation 400 moves forward in time from left to right.

As shown, audio segmentation 400 includes an input video 402 with audio in a first language. The video dubbing system 210 may receive the input video 402 as streaming media. For example, many content providers provide an initial portion of a video to build up a buffer, then stream the remaining portions at a slower or actual pace. As mentioned above, because of this, offline processing becomes infeasible as it takes long amounts of time to download a video, and bandwidth is not unnecessarily used on video that a user will not consume (e.g., because many users do not watch entire videos and it wastes bandwidth to download these entire videos).

Accordingly, as shown, the video dubbing system 210 uses a sliding window 408 (e.g., striding window) to obtain audio data from the video as it streams in. For example, the sliding window 408 acts as a streaming buffer to collect audio data in an audio buffer 404. By using the sliding window 408 the video dubbing system 210 collects an initial amount of audio data and continues to incrementally add audio data.

To illustrate, the video dubbing system 210 collects a 30-second burst of data in 3-5 seconds followed by 1-second bursts as the sliding window 408 progresses forward in time at each subsequent second. In various implementations, the 30 seconds of audio data is stored in an initial buffer 410 of the audio buffer 404. As additional data arrives, the video dubbing system 210 stores the data in sliding buffers 412. In some instances, the size of the sliding window 408, initial buffer 410, and sliding buffers 412 varies. In some implementations, a browser or application collects audio data in the audio buffer 404 as it streams to the client device.

FIG. 4 also shows the audio segmentation model 214. In various implementations, the video dubbing system 210 provides the audio data from the audio buffer 404 to the audio segmentation model 214 as it collects in the buffer. In response, the audio segmentation model 214 begins to generate segments.

In various implementations, the video dubbing system 210 uses the audio segmentation model 214 to perform batch segmentation 406 by generating audio segments of the audio from the input video 402. In some implementations, the audio segmentation model 214 uses a segmentation algorithm to segment the audio based on time duration (e.g., 5-second segments). In various implementations, the audio segmentation model 214 is a machine learning model and/or neural network that generates segments based on suitable points of segmentation (e.g., breaks, pauses, or silence) in the audio within a time range (e.g., 5-20 seconds). In some instances, the audio segmentation model 214 may generate segments of different lengths. To illustrate, the audio segmentation 400 includes the audio segmentation model 214 generating Segment A 414*a*, Segment B 414*b*, and Segment C 414*c*, which differ in length. For example, Segment B 414*b* is shorter than the other segments.

In some implementations, the audio segmentation model 214 must wait for the audio buffer 404 to collect audio data before generating an audio segment. For example, the audio segmentation model 214 catches up with the collected or stored audio data in the audio buffer 404 and must wait before generating the next audio segment. In some implementations, the audio buffer 404 lags due to limited bandwidth capabilities and/or internet connectivity issues.

The video dubbing system 210 may continue building the audio buffer 404 as audio data streams in and use the audio segmentation model 214 to generate audio segments for the entire video (as long as the user continues to play the video). Additionally, as mentioned above, the video dubbing system 210 processes the audio segmentation model 214 on a first processing thread of the client device. Indeed, the video dubbing system 210 uses the first processing thread to generate the segments in sequential order as the audio buffer 404 collects audio data.

As roughly shown in FIG. 4, when processing batches, similar operations may vary in processing time. The video dubbing system 210 may track processing time using a real-time factor (RTF). In some instances, a longer audio segment with few words may have a smaller RTF and quickly generate translated text (e.g., TS) and translated audio (e.g., TTS), while a short audio segment with many words may have a larger RTF and take longer to perform the same operations. Generally, the RTF is less than 1 (e.g., RTF<1), meaning that the video dubbing system 210 can process an operation in less time than the duration of the audio segment being processed (e.g., a 10-second audio segment takes less than 10 seconds to process). However, in some instances, the RTF of an operation is over 1, and a processing operation takes the same or a longer duration than the audio segment.

To elaborate, in various implementations, the video dubbing system 210 performs segmentation based on a combination of voice activity detection (VAD) and RTF. For instance, the audio segmentation model 214 uses a VAD-based algorithm to generate audio segments by determining natural pauses or breaks in the audio (after a minimum time occurs (e.g., 3 or 5 seconds)), as described above. However, if a maximum time threshold elapses without generating an audio segment, the video dubbing system 210 utilizes RTF to force an audio segment, as further described below in connection with FIG. 7

Figure 5:
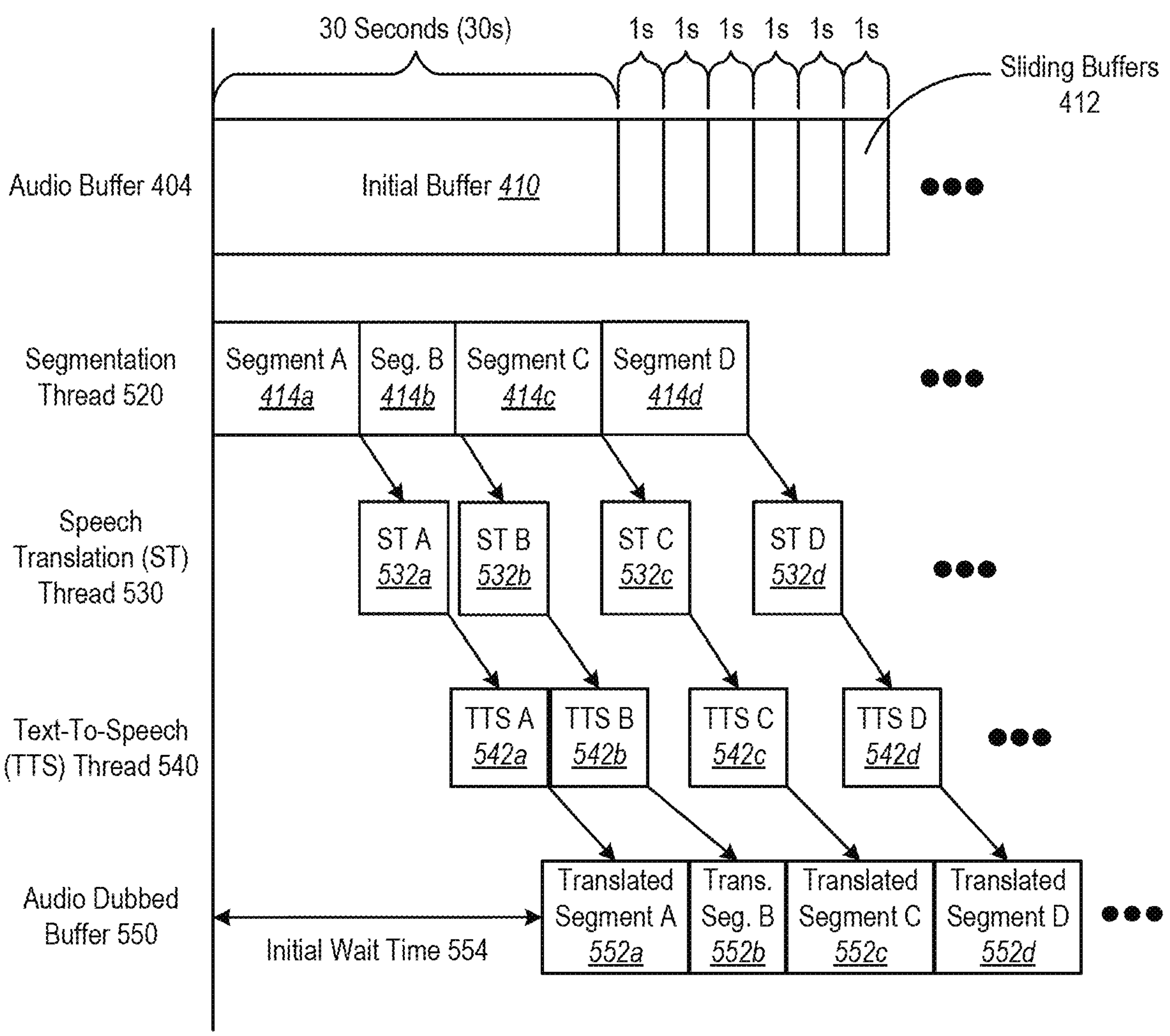
FIG. 5 illustrates a diagram of generating translated audio in a second language using multithreaded processing.

As mentioned above, FIG. 5 provides additional details about generating translated text strings and generating translated audio segments. In particular, FIG. 5 illustrates a diagram of generating translated audio in a second language using multithreaded processing according to some implementations. For example, FIG. 5 illustrates how the video dubbing system 210 uses multithreaded processing to concurrently execute different data conversion processes to generate translated audio segments in real time.

FIG. 5 includes different components (shown in rows) associated with the video dubbing system 210 performing multithreaded processing 500. Additionally, the multithreaded processing 500 moves from left to right as time advances. As shown, FIG. 5 includes the audio buffer 404, a segmentation thread 520, a speech translation thread 530 (ST thread), a text-to-speech thread 540 (TTS thread), and an audio dubbed buffer 550.

The audio buffer 404 includes the initial buffer 410 and the sliding buffers 412 described above. The audio buffer 404 keeps receiving data from the browser via a sliding window that progresses to the end of the video (or until the user stops playback).

The segmentation thread 520 includes audio segments generated by an audio segmentation model 214 on the segmentation thread 520 (e.g., the first processing thread) on the client device. As shown, the video dubbing system 210 generates a first audio segment (Segment A 414*a*), a second audio segment (Segment B 414*b*), a third audio segment (Segment C 414*c*), and a fourth audio segment (Segment D 414*d*) on the segmentation thread 520. The audio segments may vary in length as described above. As before, the audio segments may represent a batch that moves through different stages and operations of the video dubbing system 210. Additionally, there may be a pause between generated audio segments based on bandwidth capabilities and internet connectivity.

Once the first audio segment (Segment A 414*a*) is generated on the segmentation thread 520, the video dubbing system 210 can begin generating a translated text string. For example, the video dubbing system 210 utilizes the speech translation model 216 to generate translated text strings from the audio segments on the speech translation thread 530 (e.g., a second processing thread) of the client device.

To illustrate, FIG. 5 shows the video dubbing system 210 beginning to generate a first translated text string (ST A 532*a*) on the speech translation thread 530 as part of a first batch upon the first audio segment (Segment A 414*a*) being generated on the segmentation thread 520. Similarly, the video dubbing system 210 starts generating a second translated text string (ST B 532*b*) on the speech translation thread 530 as part of a second batch when the second audio segment (Segment B 414*b*) is generated. Furthermore, before beginning processing of ST B 532*b*, the video dubbing system 210 must also wait for the speech translation model 216 to finish generating ST B 532*b* (e.g., wait for the speech translation thread 530 to become available). In some implementations, the speech translation thread 530 represents multiple processing threads, which allows the video dubbing system 210 to begin processing translated text strings as soon as their corresponding audio segment is generated.

Continuing this pattern, the video dubbing system 210 generates the third translated text string (ST C 532*c*), the fourth translated text string (ST D 532*d*), and beyond on the speech translation thread 530 when the corresponding audio segments are done processing on the segmentation thread 520. However, when the audio segment in a batch is not finished processing when the speech translation thread 530 becomes available, the video dubbing system 210 may have to wait before beginning to generate the translated text string for the batch. To illustrate, the video dubbing system 210 waits for the third audio segment (Segment C 414*c*) to finish processing before the text-to-speech model 218 can commence processing the third translated text string (ST C 532*c*), as shown in FIG. 5 by the gap before the third translated text string (ST C 532*c*). Similarly, the video dubbing system 210 waits for the fourth audio segment (Segment D 414*d*) to complete on the segmentation thread 520 before processing it on the speech translation thread 530.

Looking at the text-to-speech thread 540, the video dubbing system 210 begins to generate translated audio segments upon translated text strings being generated. As shown, once the first translated text string (ST A 532*a*) on the speech translation thread 530 in the first batch is generated, the video dubbing system 210 begins to generate the first translated audio segment (TTS A 542*a*) on the text-to-speech thread 540. Following this pattern for each batch (e.g., TTS B 542*b*, TTS C 542*c*, TTS D 542*d*, etc.), once a translated text string is generated, the video dubbing system 210 can generate the corresponding translated audio segment using a text-to-speech model. In some implementations, the video dubbing system 210 waits for a given translated text string to finish generating (with the text-to-speech thread 540 idle) before generating a corresponding translated audio segment.

Upon generating the translated audio segments, the video dubbing system 210 provides and/or stores the dubbed audio in the audio dubbed buffer 550. For example, the video dubbing system 210 generates a first translated audio segment (Translated Segment A 552*a*) and provides it to the audio dubbed buffer 550. Additional translated audio segments (e.g., Translated Segment B 552*b*, Translated Segment C 552*c*, and Translated Segment D 552*d*) are stored in the audio dubbed buffer 550 as they finish generating.

As shown, the audio dubbed buffer 550 begins to build up after an initial wait time 554. In many instances, the initial wait time 554 is around 3-5 seconds (not shown to scale in FIG. 5). Additional detail about the initial wait time of the audio dubbed buffer is provided in FIG. 6 below.

As shown in FIG. 5, the video dubbing system 210 performs different data conversion operations on the different processing threads. Because the segmentation thread 520, the speech translation thread 530, and the text-to-speech thread 540 operate on different processing threads, the video dubbing system 210 may execute these operations concurrently. Furthermore, the concurrent processing allows the video dubbing system 210 to provide translated audio segments in real time.

Figure 6:
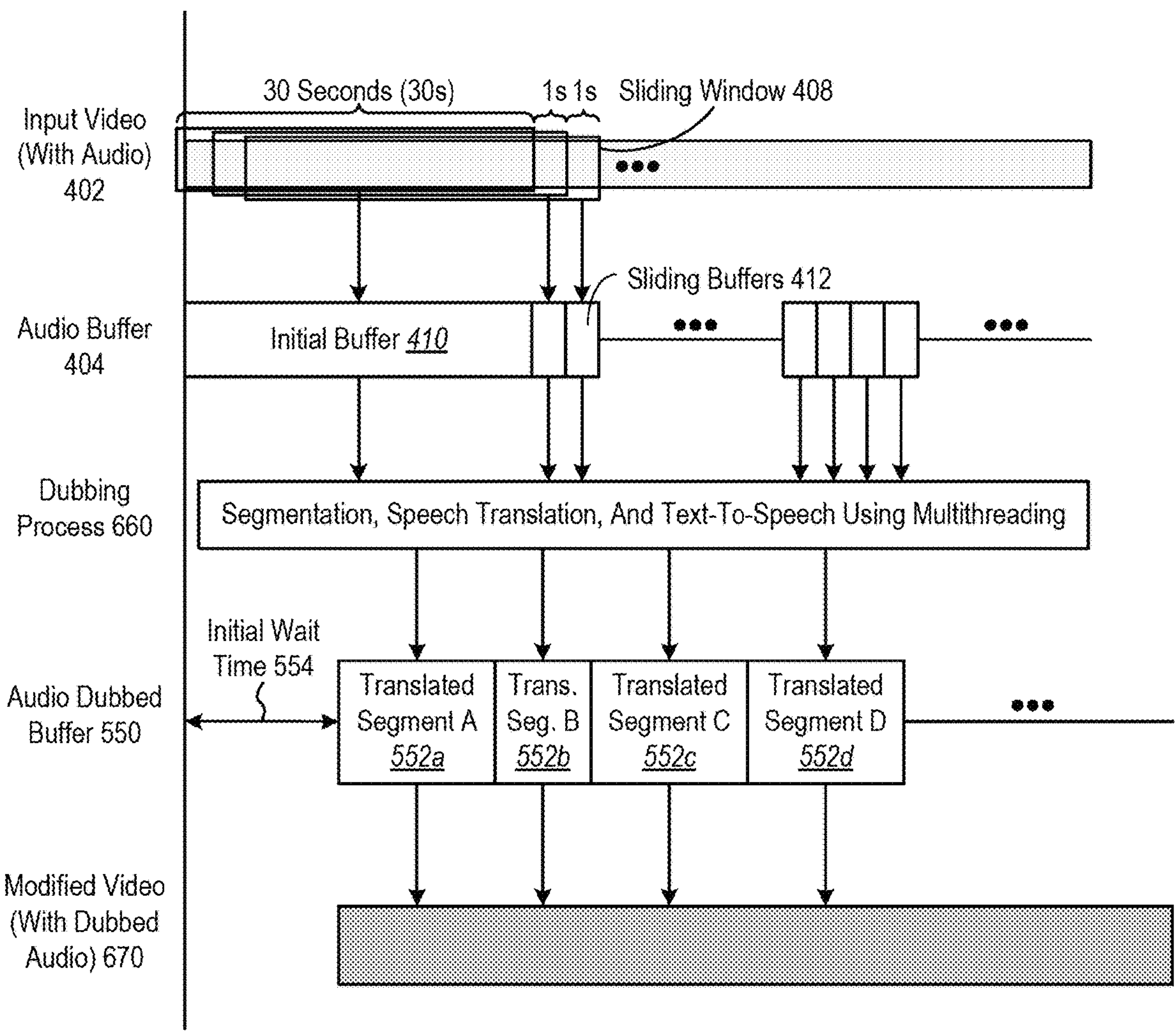
FIG. 6 illustrates a diagram summarizing of the full dubbing process.

FIG. 6 provides additional details about the generation of translated audio segments. In particular, FIG. 6 illustrates a diagram summarizing the full dubbing process according to certain implementations. FIG. 6 also includes components and operations (shown in rows) associated with the video dubbing system 210 performing a full dubbing process 600. Additionally, the full dubbing process 600 progresses from left to right.

As shown, the full dubbing process 600 includes the input video 402 and the audio buffer 404 as described above. In addition, the full dubbing process 600 includes the dubbing process 660, which corresponds to the video dubbing system 210 performing segmentation, speech translation (in a second language), and text-to-speech (in the second language) using multithreading, as described above. As shown, the dubbing process 660 generates translated audio segments and provides them to the audio dubbed buffer 550, shown as Translated Segment A 552*a*, Translated Segment B 552*b*, Translated Segment C 552*c*, and Translated Segment D 552*d*.

In various implementations, the audio dubbed buffer 550 is used to provide translated audio in the second language to the browser or application playing the video to include the dubbed audio. For example, once the initial wait time 554 has elapsed, the video dubbing system 210 may continuously provide translated audio from the audio dubbed buffer 550 until the video ends or until the user stops playback.

To further illustrate, FIG. 6 includes the modified video 670 with the dubbed audio. As shown, the modified video 670 buffers for the initial wait time 554, then begins playing. Indeed, when requesting automatic translation of the audio for a video on the fly, the video dubbing system 210 briefly buffers for a few seconds while processing the first batch to generate the first translated audio segment. Then, by using multithreading and concurrent processing, the video dubbing system 210 can provide real time continuous translated audio to the video player without any pause between batches.

In some implementations, the modified video 670 replaces the original audio in the first language with the translated audio in the second requested language. In one or more implementations, the modified video 670 adds the translated audio to the video. For example, the modified video 670 includes a quieter version of the original audio in the first language and a normal or louder volume version of the translated audio in the second language, which is heard over the original audio track.

In some implementations, the video dubbing system 210 does not modify the video but provides the translated audio, in segments, to the video player. For example, the video dubbing system 210 provides the translated audio to a browser that audio dubs the translated audio over the original audio during video playback. Furthermore, the video dubbing system 210 may provide segments of the translated audio to the browser as they become available in the audio dubbed buffer 550.

Figure 7:
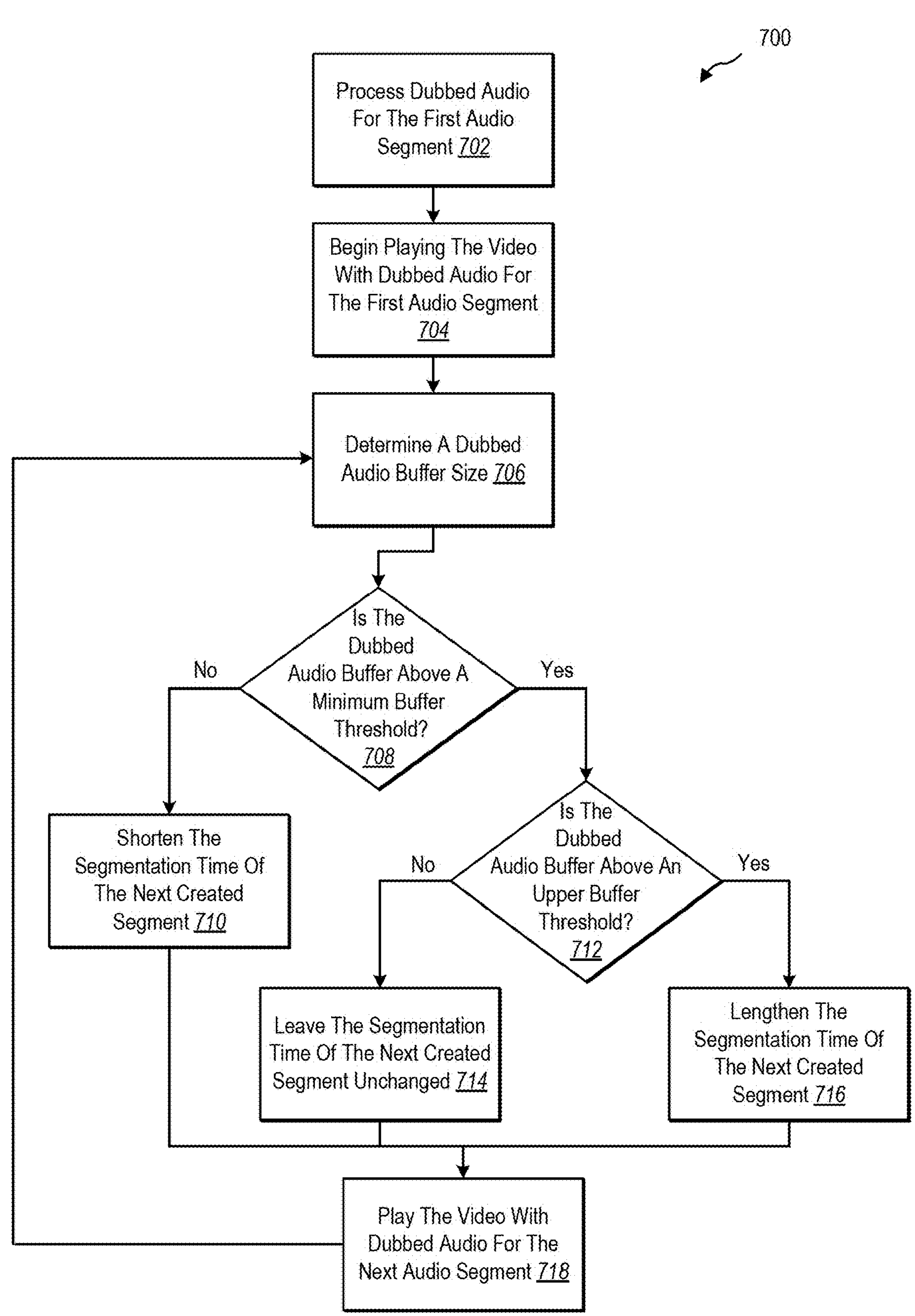
FIG. 7 illustrates a state diagram of preventing time misalignment using time-aware segmentation.

As mentioned above, FIG. 7 provides additional details about time-aware segmentation. In particular, FIG. 7 illustrates a state diagram of preventing time misalignment using time-aware segmentation according to some implementations. As shown, FIG. 7 includes a series of acts 700 performed by the video dubbing system 210 to implement time-aware segmentation.

As mentioned earlier, the video dubbing system 210 provides continuous translated audio for a video in real time regardless of the video's length. However, due to limited bandwidth capacity, internet connectivity issues (e.g., lower network speed), and processing delays, keeping the translated audio ahead of the current video playback position can be challenging. When a translated audio segment finishes playing and the next translated audio segment is not available, this leads to misalignment (e.g., the video gets ahead of the translated audio).

In some instances, if each batch included audio segments with longer durations, the multithreaded processing operations would likely backup waiting for previous operations in a batch to complete before starting the next operation. As a result, the dubbing operations would take longer to complete, and the audio dubbed buffer would be empty as the video would play faster than translated audio could be generated.

To address this issue, the video dubbing system 210 utilizes time-aware segmentation. In general, time-aware segmentation includes the video dubbing system 210 dynamically modifying the length of segments to ensure an adequate buffer of translated audio is stored in the audio dubbed buffer. Indeed, the video dubbing system 210 can increase segment lengths when the audio dubbed buffer has a large amount of translated audio or decrease segment lengths when the audio dubbed buffer is depleted.

To further illustrate, the series of acts 700 includes act 702 of processing dubbed audio for the first audio segment. For example, the video dubbing system 210 processes the first batch of audio data to convert the first audio segment into a translated audio segment, as described above. In various implementations, the video dubbing system 210 selects a default audio buffer size for the first audio segment. In some instances, the first audio segment is larger than average to allow the dubbed audio buffer to build up translated audio segments while the first translated audio segment plays in the video (e.g., the first audio segment is larger than the second audio segment).

Act 704 includes beginning to play the video with dubbed audio for the first audio segment. For instance, the client device plays the video with the audio in the second language played over, or in place of, the original audio in the first language. Indeed, the translated video can start playing when the first translated segment is available.

Act 706 includes determining a dubbed audio buffer size. As mentioned above, the audio dubbed buffer maintains the processed batches of translated audio segments. In one or more implementations, the video dubbing system 210 determines the dubbed audio buffer size based on the formula $T^v - T^d$, where $T^v$ represents the current position or timestamp of the video being played and $T^d$ represents the latest provided translated audio segment. In various implementations, the video dubbing system 210 measures the dubbed audio buffer size based on the number of waiting translated audio segments. In some implementations, the video dubbing system 210 measures the dubbed audio buffer size based on time duration (e.g., the number of seconds of available and/or continuous translated audio).

Act 708 includes determining whether the dubbed audio buffer is above a minimum buffer threshold. For instance, the video dubbing system 210 compares the dubbed audio buffer to a minimum buffer amount, value, limit, or duration. For example, if the threshold is based on the number of segments, the video dubbing system 210 determines whether the number of translated audio segments in the audio dubbed buffer equals or is greater than the minimum segment number. If based on time duration, the video dubbing system 210 determines whether the duration of the translated audio segment queued in the audio dubbed buffer equals or is greater than the minimum time duration.

If the minimum buffer threshold is not satisfied (e.g., "No"), then the video dubbing system 210 proceeds to act 710, which includes shortening the segmentation time of the next created segment. For example, the video dubbing system 210 instructs the audio segmentation model 214 to generate a shorter audio segment for the next segment created from audio data in the audio buffer. By creating shorter audio segments, the video dubbing system 210 reduces the time needed to process the audio segment into a translated audio segment and provide it to the dubbed audio buffer. In this way, the video dubbing system 210 detects and prevents future misalignment. In some instances, the video dubbing system 210 shortens a segmentation time range by reducing the minimum and/or maximum threshold times (e.g., the minimum threshold and/or the maximum threshold is shortened by 2 seconds).

If the minimum buffer threshold is satisfied and the dubbed audio buffer is above the minimum buffer threshold, the video dubbing system 210 advances to act 712, which includes determining whether the dubbed audio buffer is above an upper buffer threshold. For instance, the video dubbing system 210 compares the dubbed audio buffer to an upper buffer amount, value, limit, or duration. Similar to the above, if the threshold is based on the number of segments, the video dubbing system 210 determines whether the number of translated audio segments in the audio dubbed buffer equals or is less than the upper segment number. If based on time duration, the video dubbing system 210 determines whether the duration of the translated audio segment queued in the audio dubbed buffer equals or is greater than the upper time duration.

If the audio dubbed buffer does not satisfy the upper buffer threshold, then the video dubbing system 210 proceeds to act 714, which includes leaving the segmentation time of the next created segment unchanged. In particular, if the audio dubbed buffer is between the minimum and the upper buffer threshold, the video dubbing system 210 leaves the segment length of the next segment to be created unchanged. This allows the audio segmentation model 214 to operate in generating audio segments using its current settings.

If the upper buffer threshold is satisfied and the dubbed audio buffer is above the upper buffer threshold, the video dubbing system 210 advances to act 716, which includes lengthening the segmentation duration of the next created segment. For example, the video dubbing system 210 directs the audio segmentation model 214 to create an extended or longer audio segment for the next segment to be generated on the first processing thread. In some instances, the video dubbing system 210 lengthens a segmentation time range by extending the minimum and/or maximum threshold times (e.g., the minimum threshold and/or the maximum threshold is increased by 5 seconds).

When the upper buffer threshold is met or satisfied, the audio dubbed buffer has accumulated sufficient translated audio that the video dubbing system 210 can take additional time to process longer audio batches. In some instances, the video dubbing system 210 achieves efficiency gains by processing longer audio segments in a batch. Accordingly, when the audio dubbed buffer is sufficiently full, the video dubbing system 210 allows one or more batches to process longer durations of audio segments.

In some implementations, when act 708 results in the audio dubbed buffer being above the minimum buffer threshold, the video dubbing system 210 increases or extends the segmentation duration of the next created segment. In various implementations, the video dubbing system 210 determines the extent of the lengthening of the audio segment duration based on the amount of translated audio data is in the audio dubbed buffer. For instance, the video dubbing system 210 correlates the amount of translated audio above the minimum buffer threshold with a lengthening factor for extending the next audio segment to be created.

As shown in the series of acts 700, act 710, act 714, and act 716 each leads to act 718 of playing the video with dubbed audio for the next audio segment. For instance, the video continues to play with the next translated audio segment in the audio dubbed buffer. Furthermore, once act 718 occurs and the video plays the next available translated audio segment in the audio dubbed buffer, the video dubbing system 210 returns to act 706 of determining the audio dubbed buffer size. Additionally, the video dubbing system 210 repeats acts 706-718 until the video is finished.

As mentioned above, in various implementations, the video dubbing system 210 utilizes real-time factors (RTFs) to generate audio segments. For example, if an audio segment is not generated in the allowed time based on voice activity detection (VAD), the video dubbing system 210 may use RTF in connection with performing time-aware segmentation to generate an audio segment. By considering RTFs when performing time-aware segmentation, the video dubbing system 210 can avoid potential audio misalignment.

To illustrate, the video dubbing system 210 may check every b seconds to determine if a segment has been created based on VAD. In some instances, b may change based on time-aware segmentation adjustments and/or be a time range. If an audio segment (e.g., a VAD segment) is created, the video dubbing system 210 waits another b seconds before checking in again. However, if an audio segment is not created, the video dubbing system 210 may force a segment to avoid misalignment.

In one or more implementations, the video dubbing system 210 verifies the following conditions to determine when to force segmentation. In particular, the video dubbing system 210 performs a forced segmentation when the following conditions are true:

$$((T^v-T^d-b)\leq \text{CurrentSegmentLength}+b)\times rtf$$

and $$\text{CurrentSegmentLength}\geq S_{min}$$

In the above conditions, $T^v$ represents the current position or timestamp of the video being played, $T^d$ represents the latest provided translated audio segment, b represents a buffer queue or interval at which forced segmentation is checked, CurrentSegmentLength represents the length of the accumulated segment, $S_{min}$ represents a minimum segment length (e.g., 5 s), and rtf represents RTF averaged over all segments.

As shown in the conditions above, the video dubbing system 210 checks for possible cases of misalignment by adding b to CurrentSegmentLength on one hand and subtracting b from $T^v-T^d$ on the other. Additionally, in the conditions above, the expression "$(T^v-T^d)-b$)" indicates an amount of available time before a time misalignment occurs, and the expression "CurrentSegmentLength+b)×rtf" indicates the time required to process the segment.

In various implementations, when performing time-aware segmentation with RTF, the video dubbing system 210 accounts for the concurrent architecture. For example, while checking for segmentation, the video dubbing system 210 may partly process some part of the previous segment due to using batch concurrent architecture. These partly processed segments may not be included in $T^d$.

To address this issue, in various implementations, the video dubbing system 210 utilizes a relaxed $T^d$ parameter. For instance, the video dubbing system 210 relaxes $T^d$ based on a processed amount of the previous segment ($t_{pp}$). For example, $T^{d\text{-}Relaxed}=T^d-t_{pp}$. In some implementations, $t_{pp}$ is determined based on $t_p/(\text{PreviousSegmentLength}\times\text{rtf})$, where $t_p$ represents the amount of time spent in processing the previous segment.

In these implementations, the video dubbing system 210 may determine to perform a forced segmentation when the following updated conditions are true:

$$((T^v-T^{d\text{-}Relaxed}-b)\leq \text{CurrentSegmentLength}+b)\times rtf$$

and $$\text{CurrentSegmentLength}\geq S_{min}$$

By dynamically adjusting the lengths of audio segments in the batches, the video dubbing system 210 automatically adapts the segment length based on timing discrepancies, prevents misalignments, and delivers the video with accurately translated audio at the corresponding time. Moreover, when the audio dubbed buffer accumulates, the video dubbing system 210 can improve the efficiency of the system by processing larger batch sizes until the audio dubbed buffer falls below the upper buffer threshold. By using time-aware segmentation, the video dubbing system 210 provides high-quality real-time dubbing.

Figure 8:
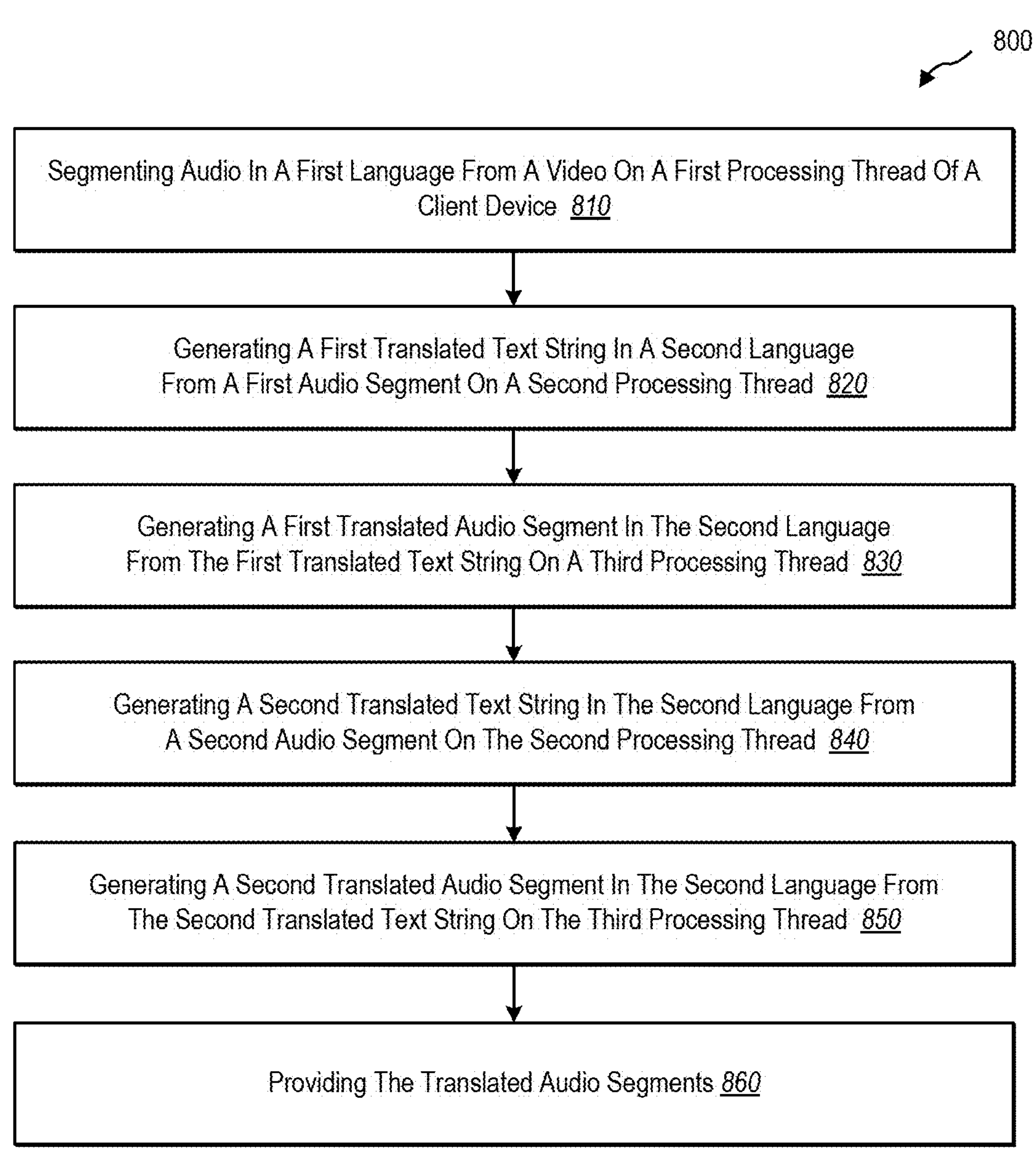
FIGS. 8 and 9 each illustrate an example series of acts in a computer-implemented method for generating real-time audio translations in one or more videos.
Figure 9:
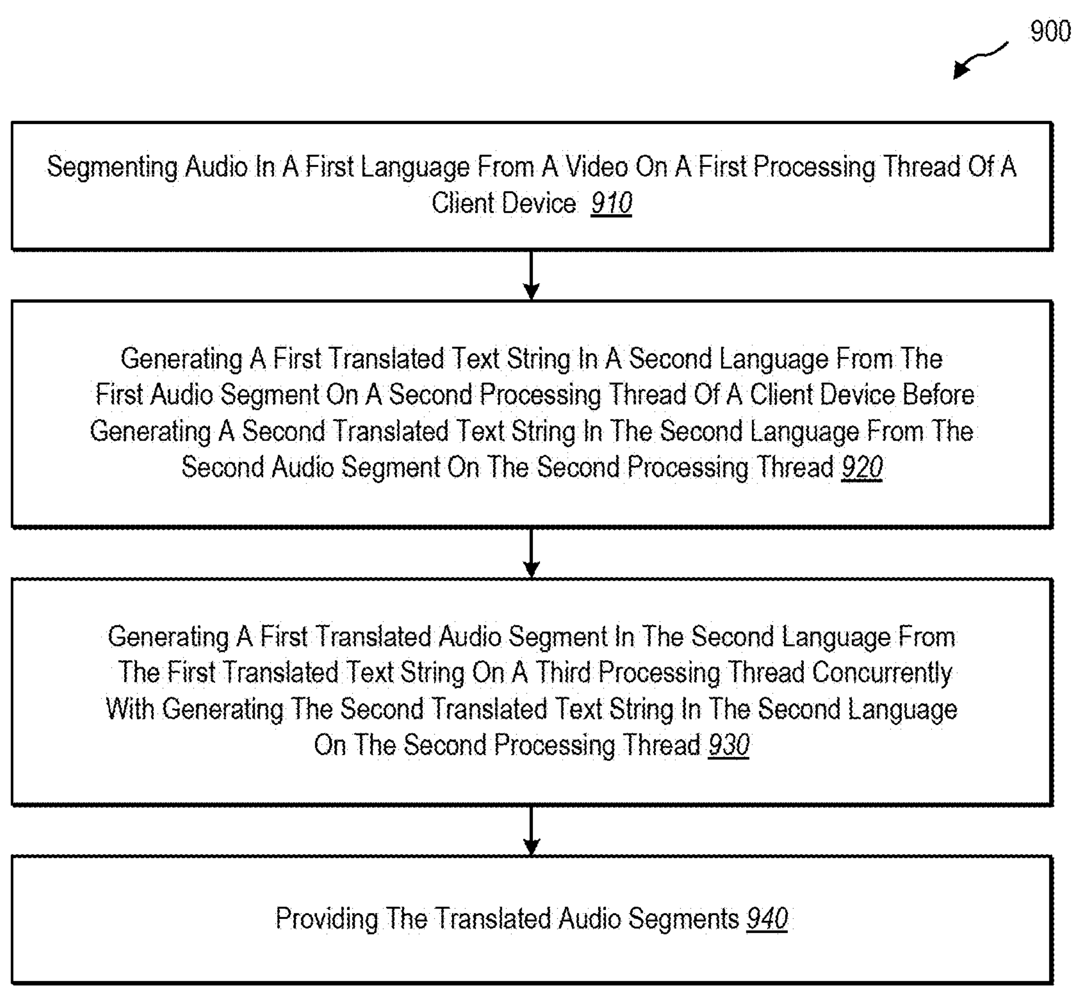

Turning now to FIG. 8 and FIG. 9, each of these figures illustrates an example series of acts in a computer-implemented method for generating real-time audio translations in one or more videos according to some implementations. While FIG. 8 and FIG. 9 both illustrate acts according to one or more implementations, alternative implementations may omit, add, reorder, and/or modify any of the acts shown.

The acts in FIG. 8 and FIG. 9 can be performed as part of a method (e.g., a computer-implemented method). Alternatively, a computer-readable medium can include instructions that, when executed by a processing system with a processor, cause a computing device to perform the acts in FIG. 8 or FIG. 9. In some implementations, a system (e.g., a processing system comprising a processor) can perform the acts in FIG. 8 or FIG. 9. For example, the system includes a processing system and a computer memory including instructions that, when executed by the processing system, cause the system to perform various actions, operations, or steps.

To illustrate, in FIG. 8, the series of acts 800 includes act 810 of segmenting audio in a first language from a video on a first processing thread of a client device. For instance, in example implementations, act 810 involves segmenting audio in a first language from a video in a first language into a first audio segment and a second audio segment using an audio segmentation model on a first processing thread of a client device.

As further shown, the series of acts 800 includes act 820 of generating a first translated text string in a second language from a first audio segment on a second processing thread. For instance, in example implementations, act 820 involves generating a first translated text string in a second language from the first audio segment using a speech translation model on a second processing thread of the client device.

As further shown, the series of acts 800 includes act 830 of generating a first translated audio segment in the second language from the first translated text string on a third processing thread. For instance, in some implementations, act 830 involves generating a first translated audio segment in the second language from the first translated text string using a text-to-speech model corresponding to the second language on a third processing thread of the client device.

Furthermore, the series of acts 800 includes act 840 of generating a second translated text string in the second language from a second audio segment on the second processing thread. For instance, in example implementations, act 840 involves, concurrently with generating the first translated audio segment on the third processing thread, generating a second translated text string in the second language from the second audio segment using the speech translation model on the second processing thread of the client device.

As further shown, the series of acts 800 includes act 850 of generating a second translated audio segment in the second language from the second translated text string on the third processing thread. For instance, in some implementations, act 850 involves generating a second translated audio segment in the second language from the second translated text string using the text-to-speech model on the third processing thread of the client device.

Furthermore, the series of acts 800 includes act 860 of providing the translated audio segments. For instance, in example implementations, act 860 involves providing the first translated audio segment with the video.

As shown in FIG. 9, the series of acts 900 includes act 910 of segmenting audio in a first language from a video on a first processing thread of a client device. For instance, in example implementations, act 910 involves segmenting audio in a first language from a video in a first language into a first audio segment and a second audio segment using an audio segmentation model on a first processing thread of a client device.

As further shown, the series of acts 900 includes act 920 of generating a first translated text string in a second language from the first audio segment on a second processing thread of a client device before generating a second translated text string in the second language from the second audio segment on the second processing thread. For instance, in example implementations, act 920 involves generating a first translated text string in a second language from the first audio segment using a speech translation model on a second processing thread of the client device before generating a second translated text string in the second language from the second audio segment using the speech translation model on the second processing thread.

As further shown, the series of acts 900 includes act 930 of generating a first translated audio segment in the second language from the first translated text string on a third processing thread concurrently with generating the second translated text string in the second language on the second processing thread. For instance, in some implementations, act 930 involves generating a first translated audio segment in the second language from the first translated text string using a text-to-speech model corresponding to the second language on a third processing thread of the client device concurrently with, or while simultaneously generating the second translated text string in the second language on the second processing thread.

Furthermore, the series of acts 900 includes act 940 of providing the translated audio segment. For instance, in example implementations, act 940 involves providing the first translated audio segment with the video.

The series of acts in FIG. 8 and/or FIG. 9 can include additional acts. For example, in some implementations, in connection with the series of acts, the first processing thread, the second processing thread, and the third processing thread differ from each other, and the client device implements the first processing thread, the second processing thread, and the third processing thread concurrently or in parallel. In some implementations, the series of acts includes determining a time misalignment between the first translated audio segment and the second translated audio segment; and implementing time-aware segmentation at the audio segmentation model to generate a third audio segment with a shorter duration than the second audio segment from the audio (which is part of the video).

In some implementations, the series of acts include determining a buffer surplus between the first translated audio segment and the second translated audio segment; and implementing time-aware segmentation at the audio segmentation model to generate a third audio segment with a longer duration than the second audio segment from the audio (which is part of the video). In some implementations, the series of acts includes receiving a request at the client device to convert audio in the video from the first language to the second language, where segmenting the video into audio segments occurs in response to the request.

In some implementations, in relation to the series of acts, the first translated text string is generated by the audio segmentation model on the second processing thread of the client device after segmenting the first audio segment. In some instances, generating the second translated text string in the second language begins on the second processing thread upon the first translated audio segment being generated by the speech translation model on the second processing thread of the client device and the second translated text string being segmented by the audio segmentation model on the second processing thread.

In some instances, generating the second translated audio segment in the second language includes starting or beginning to generate the second translated audio segment on the third processing thread of the client device upon the first translated audio segment being generated by the text-to-speech model on the third processing thread of the client device and the second translated text string being segmented by the audio segmentation model on the second processing thread. In some implementations, the series of acts includes providing the second translated audio segment with the video before the first translated audio segment finishes playing with the video.

In various implementations, providing the first translated audio segment with the video includes replacing a first audio portion of the video with the first translated audio segment. In one or more implementations, providing the first translated audio segment with the video includes dubbing a first audio portion of the video with the first translated audio segment.

In some implementations, the series of acts includes determining a time misalignment between the first translated audio segment and the second translated audio segment, and implementing time-aware segmentation at the audio segmentation model when generating a third audio segment from the audio (which is part of the video) . . . . In some instances, determining the time misalignment is based on comparing a current video timestamp with a dubbed video timestamp. In one or more implementations, comparing the current video timestamp with the dubbed video timestamp indicates a current dubbed buffer time amount, and determining the time misalignment is based on the current dubbed buffer time amount not meeting or satisfying a minimum dubbed buffer threshold.

In various implementations, implementing time-aware segmentation in the audio segmentation model includes generating the third audio segment to be of a shorter duration than the second audio segment. In one or more implementations, translated audio segments are continuously provided in sequential order without a pause between the end of playing audio in the second language in one segment and playing audio in the second language in the next segment.

In some implementations, the series of acts includes generating a second translated audio segment in the second language from the second translated text string using the text-to-speech model on the third processing thread of the client device after generating the first translated audio segment on the third processing thread. In one or more implementations, a browser application on the client device generates and provides translated audio segments using the first processing thread, the second processing thread, and the third processing thread concurrently or in parallel, and the video plays with the translated audio segments providing dubbed audio in the second language continuously until the end of the video.

Figure 10:
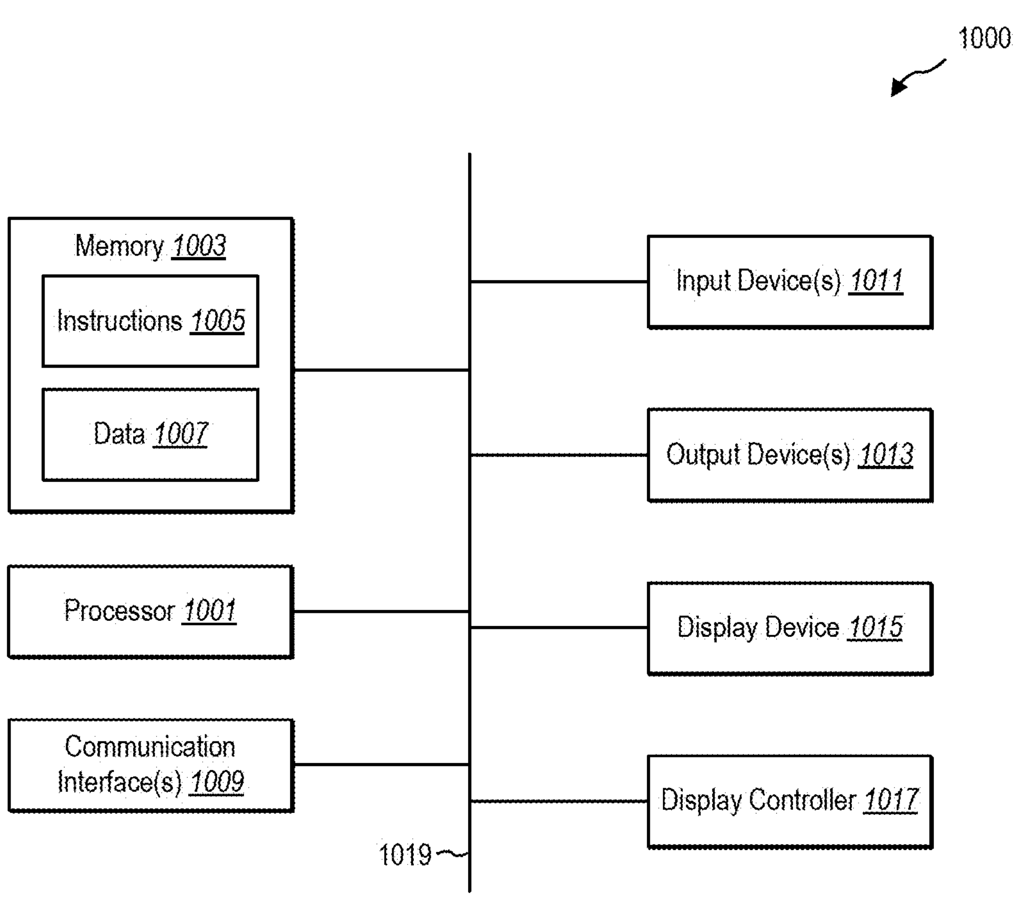
FIG. 10 illustrates example components included within a computer system used to implement the video dubbing system.

FIG. 10 illustrates certain components that may be included within a computer system 1000. The computer system 1000 may be used to implement the various computing devices, components, and systems described herein (e.g., by performing computer-implemented instructions). As used herein, a "computing device" refers to electronic components that perform a set of operations based on a set of programmed instructions. Computing devices include groups of electronic components, client devices, server devices, etc.

In various implementations, the computer system 1000 represents one or more of the client devices, server devices, or other computing devices described above. For example, the computer system 1000 may refer to various types of network devices capable of accessing data on a network, a cloud computing system, or another system. For instance, a client device may refer to a mobile device such as a mobile telephone, a smartphone, a personal digital assistant (PDA), a tablet, a laptop, or a wearable computing device (e.g., a headset or smartwatch). A client device may also refer to a non-mobile device such as a desktop computer, a server node (e.g., from another cloud computing system), or another non-portable device.

The computer system 1000 includes a processing system including a processor 1001. The processor 1001 may be a general-purpose single- or multi-chip microprocessor (e.g., an Advanced Reduced Instruction Set Computer (RISC) Machine (ARM)), a special-purpose microprocessor (e.g., a digital signal processor (DSP)), a microcontroller, a programmable gate array, etc. The processor 1001 may be referred to as a central processing unit (CPU) and may cause computer-implemented instructions to be performed. Although the processor 1001 shown is just a single processor in the computer system 1000 of FIG. 10, in an alternative configuration, a combination of processors (e.g., an ARM and DSP) could be used.

The computer system 1000 also includes memory 1003 in electronic communication with the processor 1001. The memory 1003 may be any electronic component capable of storing electronic information. For example, the memory 1003 may be embodied as random-access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM), registers, and so forth, including combinations thereof.

The instructions 1005 and the data 1007 may be stored in the memory 1003. The instructions 1005 may be executable by the processor 1001 to implement some or all of the functionality disclosed herein. Executing the instructions 1005 may involve the use of the data 1007 that is stored in the memory 1003. Any of the various examples of modules and components described herein may be implemented, partially or wholly, as instructions 1005 stored in memory 1003 and executed by the processor 1001. Any of the various examples of data described herein may be among the data 1007 that is stored in memory 1003 and used during the execution of the instructions 1005 by the processor 1001.

A computer system 1000 may also include one or more communication interface(s) 1009 for communicating with other electronic devices. The one or more communication interface(s) 1009 may be based on wired communication technology, wireless communication technology, or both. Some examples of the one or more communication interface (s) 1009 include a Universal Serial Bus (USB), an Ethernet adapter, a wireless adapter that operates according to an Institute of Electrical and Electronics Engineers (IEEE) 1002.11 wireless communication protocol, a Bluetooth® wireless communication adapter, and an infrared (IR) communication port.

A computer system 1000 may also include one or more input device(s) 1011 and one or more output device(s) 1013. Some examples of the one or more input device(s) 1011 include a keyboard, mouse, microphone, remote control device, button, joystick, trackball, touchpad, and light pen. Some examples of the one or more output device(s) 1013 include a speaker and a printer. A specific type of output device that is typically included in a computer system 1000 is a display device 1015. The display device 1015 used with implementations disclosed herein may utilize any suitable image projection technology, such as liquid crystal display (LCD), light-emitting diode (LED), gas plasma, electroluminescence, or the like. A display controller 1017 may also be provided, for converting data 1007 stored in the memory 1003 into text, graphics, and/or moving images (as appropriate) shown on the display device 1015.

The various components of the computer system 1000 may be coupled together by one or more buses, which may include a power bus, a control signal bus, a status signal bus, a data bus, etc. For clarity, the various buses are illustrated in FIG. 10 as a bus system 1019.

Furthermore, upon reaching various computer system components, program code means in the form of computer-executable instructions or data structures can be transferred automatically from transmission media to non-transitory computer-readable storage media (devices), or vice versa. For example, computer-executable instructions or data structures received over a network or data link can be buffered in random-access memory (RAM) within a network interface module (NIC), and then it is eventually transferred to computer system RAM and/or to less volatile computer storage media (devices) at a computer system. Thus, it should be understood that computer-readable storage media (devices) can be included in computer system components that also (or even primarily) utilize transmission media.

Computer-executable instructions include instructions and data that, when executed by a processor, cause a general-purpose computer, special-purpose computer, or special-purpose processing device to perform a certain function or group of functions. In some implementations, computer-executable and/or computer-implemented instructions are executed by a general-purpose computer to turn the general-purpose computer into a special-purpose computer implementing elements of the disclosure. The computer-executable instructions may include, for example, binaries, intermediate format instructions such as assembly language, or even source code. Although the subject matter has been described in language specific to structural features and/or methodological acts, it is to be understood that the subject matter defined in the appended claims is not necessarily limited to the features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or a combination of hardwired and wireless data links) through a network, both perform tasks. In a distributed system environment, program modules may be located in both local and remote memory storage devices.

The techniques described herein may be implemented in hardware, software, firmware, or any combination thereof unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium, including instructions that, when executed by at least one processor, perform one or more of the methods described herein (including computer-implemented methods). The instructions may be organized into routines, programs, objects, components, data structures, etc., which may perform particular tasks and/or implement particular data types, and which may be combined or distributed as desired in various implementations.

Computer-readable media can be any available media that can be accessed by a general-purpose or special-purpose computer system. Computer-readable media that store computer-executable instructions are non-transitory computer-readable storage media (devices). Computer-readable media that carry computer-executable instructions are transmission media. Thus, by way of example, implementations of the disclosure can include at least two distinctly different kinds of computer-readable media: non-transitory computer-readable storage media (devices) and transmission media.

As used herein, computer-readable storage media (devices) may include RAM, ROM, EEPROM, CD-ROM, solid-state drives (SSDs) (e.g., based on RAM), Flash memory, phase-change memory (PCM), other types of memory, other optical disk storage, magnetic disk storage or other magnetic storage devices, or any other medium which can be used to store desired program code means in the form of computer-executable instructions or data structures and which can be accessed by a general-purpose or special-purpose computer.

The steps and/or actions of the methods described herein may be interchanged with one another without departing from the scope of the claims. In other words, unless a specific order of steps or actions is required for the proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a data repository, or another data structure), ascertaining, and the like. Also, "determining" can include receiving (e.g., receiving information), accessing (e.g., accessing data in a memory), and the like. Also, "determining" can include resolving, selecting, choosing, establishing, and the like.

The terms "comprising," "including," and "having" are intended to be inclusive and mean that there may be additional elements other than the listed elements. Additionally, it should be understood that references to "one implementation" or "implementations" of the present disclosure are not intended to be interpreted as excluding the existence of additional implementations that also incorporate the recited features. For example, any element or feature described concerning an implementation herein may be combinable with any element or feature of any other implementation described herein, where compatible.

The present disclosure may be embodied in other specific forms without departing from its spirit or characteristics. The described implementations are to be considered illustrative and not restrictive. The scope of the disclosure is indicated by the appended claims rather than by the foregoing description. Changes that fall within the meaning and range of equivalency of the claims are to be embraced within their scope.

What is claimed is:

1. A computer-implemented method for generating real-time audio translations in one or more videos, comprising:

segmenting audio in a first language from a video in a first language into a first audio segment and a second audio segment using an audio segmentation model on a first processing thread of a client device;

generating a first translated text string in a second language from the first audio segment using a speech translation model on a second processing thread of the client device;

generating a first translated audio segment in the second language from the first translated text string using a text-to-speech model corresponding to the second language on a third processing thread of the client device;

concurrent with generating the first translated audio segment on the third processing thread, generating a second translated text string in the second language from the second audio segment using the speech translation model on the second processing thread of the client device;

generating a second translated audio segment in the second language from the second translated text string using the text-to-speech model on the third processing thread of the client device; and providing the first translated audio segment with the video.

2. The computer-implemented method of claim 1, wherein:

the first processing thread, the second processing thread, and the third processing thread differ from each other; and the client device implements the first processing thread, the second processing thread, and the third processing thread concurrently.

3. The computer-implemented method of claim 1, further comprising:

determining a time misalignment between the first translated audio segment and the second translated audio segment; and implementing time-aware segmentation at the audio segmentation model to generate a third audio segment with a shorter duration than the second audio segment from the audio.

4. The computer-implemented method of claim 1, further comprising:

determining a buffer surplus between the first translated audio segment and the second translated audio segment; and implementing time-aware segmentation at the audio segmentation model to generate a third audio segment with a longer duration than the second audio segment from the audio.

5. The computer-implemented method of claim 1, further comprising receiving a request at the client device to convert audio in the video from the first language to the second language, wherein segmenting the video into audio segments occurs in response to the request.

6. The computer-implemented method of claim 1, wherein the first translated text string is generated by the audio segmentation model on the second processing thread of the client device after segmenting the first audio segment.

7. The computer-implemented method of claim 6, wherein generating the second translated text string in the second language begins on the second processing thread upon:

the first translated audio segment being generated by the speech translation model on the second processing thread of the client device; and the second translated text string being segmented by the audio segmentation model on the second processing thread.

8. The computer-implemented method of claim 1, wherein generating the second translated audio segment in the second language includes beginning generating the second translated audio segment on the third processing thread of the client device upon:

the first translated audio segment being generated by the text-to-speech model on the third processing thread of the client device; and the second translated text string being segmented by the audio segmentation model on the second processing thread.

9. The computer-implemented method of claim 1, further comprising providing the second translated audio segment with the video before the first translated audio segment finishes playing with the video.

10. The computer-implemented method of claim 1, wherein providing the first translated audio segment with the video includes replacing a first audio portion of the video with the first translated audio segment.

11. The computer-implemented method of claim 1, wherein providing the first translated audio segment with the video includes dubbing a first audio portion of the video with the first translated audio segment.

12. A system comprising:

a processing system having a processor; and a computer memory including instructions that, when executed by the processing system, cause the system to carry out operations comprising:

segmenting audio in a first language from a video into a first audio segment and a second audio segment using an audio segmentation model on a first processing thread of a client device;

generating a first translated text string in a second language from the first audio segment using a speech translation model on a second processing thread of the client device;

generating a first translated audio segment in the second language from the first translated text string using a text-to-speech model corresponding to the second language on a third processing thread of the client device;

concurrent with generating the first translated audio segment on the third processing thread, generating a second translated text string in the second language from the second audio segment using the speech translation model on the second processing thread of the client device;

generating a second translated audio segment in the second language from the second translated text string using the text-to-speech model on the third processing thread of the client device; and providing the first translated audio segment with the video.

13. The system of claim 12, further comprising instructions that, when executed by the processing system, cause the system to carry out operations comprising:

determining a time misalignment between the first translated audio segment and the second translated audio segment; and implementing time-aware segmentation at the audio segmentation model when generating a third audio segment from the audio.

14. The system of claim 13, wherein determining the time misalignment is based on comparing a current video timestamp with a dubbed video timestamp.

15. The system of claim 14, wherein:

comparing the current video timestamp with the dubbed video timestamp indicates a current dubbed buffer time amount; and determining the time misalignment is based on the current dubbed buffer time amount not satisfying a minimum dubbed buffer threshold.

16. The system of claim 13, wherein implementing time-aware segmentation at the audio segmentation model includes generating the third audio segment to be of a shorter duration than the second audio segment.

17. The system of claim 12, wherein translated audio segments are continuously provided in sequential order without a pause between an end of playing audio in the second language in one segment and playing audio in the second language in a next segment.

18. A computer-implemented method for generating real-time audio translations in one or more videos, comprising:

segmenting audio in a first language from a video into a first audio segment and a second audio segment on a first processing thread of a client device;

generating a first translated text string in a second language from the first audio segment using a speech translation model on a second processing thread of the client device before generating a second translated text string in the second language from the second audio segment using the speech translation model on the second processing thread;

generating a first translated audio segment in the second language from the first translated text string using a text-to-speech model corresponding to the second language on a third processing thread of the client device concurrently with generating the second translated text string in the second language on the second processing thread; and providing the first translated audio segment with the video.

19. The computer-implemented method of claim 18, further comprising generating a second translated audio segment in the second language from the second translated text string using the text-to-speech model on the third processing thread of the client device after generating the first translated audio segment on the third processing thread.

20. The computer-implemented method of claim 18, wherein:

a browser application on the client device generates and provides translated audio segments using the first processing thread, the second processing thread, and the third processing thread concurrently; and the video plays with the translated audio segments providing dubbed audio in the second language continuously until an end of the video.

* * * * *